(12) United States Patent
Woo et al.

(10) Patent No.: US 12,485,973 B2
(45) Date of Patent: Dec. 2, 2025

(54) FASTENING APPARATUS FOR VEHICLE

(71) Applicant: HYUNDAI MOBIS CO., LTD., Seoul (KR)

(72) Inventors: Hyun Jin Woo, Yongin-si (KR); Jong Sung Park, Yongin-si (KR); Hyoun Young Oh, Yongin-si (KR); Ho Youn Hwang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 435 days.

(21) Appl. No.: 17/861,585

(22) Filed: Jul. 11, 2022

(65) Prior Publication Data
US 2023/0056302 A1  Feb. 23, 2023

(30) Foreign Application Priority Data

Aug. 23, 2021 (KR) .................. 10-2021-0110897
Aug. 23, 2021 (KR) .................. 10-2021-0110900

(51) Int. Cl.
  *B62D 25/20* (2006.01)
  *B62D 24/00* (2006.01)
  *B62D 27/06* (2006.01)
  *B62D 65/02* (2006.01)

(52) U.S. Cl.
  CPC ......... *B62D 25/2009* (2013.01); *B62D 27/06* (2013.01); *B62D 65/02* (2013.01); *B62D 24/00* (2013.01); *B62D 27/065* (2013.01)

(58) Field of Classification Search
  CPC .... B62D 25/2009; B62D 27/06; B62D 65/02; B62D 24/00; B62D 27/065; B62D 21/02; B62D 65/024; B60K 1/04

USPC ....................................... 296/193.07
  See application file for complete search history.

(56) References Cited

U.S. PATENT DOCUMENTS

| | | | | |
|---|---|---|---|---|
| 3,594,876 | A * | 7/1971 | Gunther ............... | F16B 21/04 411/555 |
| 9,926,017 | B1 * | 3/2018 | Hamilton ............. | B62D 25/20 |
| 11,767,066 | B2 * | 9/2023 | Woo ..................... | B62D 65/024 296/35.1 |
| 11,878,736 | B2 * | 1/2024 | Doll ..................... | B62D 65/024 |
| 2012/0255800 | A1 * | 10/2012 | Lejeune ................ | F16B 21/02 248/220.21 |
| 2019/0092398 | A1 * | 3/2019 | Arisa Busquets .... | F16B 33/004 |
| 2021/0179182 | A1 * | 6/2021 | Kim ..................... | B62D 25/081 |
| 2021/0179203 | A1 * | 6/2021 | Olsson ................. | B62D 33/0604 |
| 2023/0056169 | A1 * | 2/2023 | Woo ..................... | B60K 1/04 |

(Continued)

FOREIGN PATENT DOCUMENTS

| | | | |
|---|---|---|---|
| CN | 217435494 U | * | 9/2022 |
| DE | 102022127873 A1 | * | 5/2024 |
| KR | 10-2021-0077367 A | | 6/2021 |

*Primary Examiner* — Patricia L Engle
(74) *Attorney, Agent, or Firm* — NSIP Law

(57) ABSTRACT

A fastening apparatus for a vehicle includes a first fastening unit fixed to a first structure, a casing fixed to a second structure and configured to face the first fastening unit, a moving unit installed inside the casing, and the moving unit being configured to ascend and descend, a second fastening unit rotatably combined with the moving unit and being configured to be fastened to or separated from the first fastening unit according to a rotational direction, and a restoration unit being configured to restore the moving unit to an initial position thereof, in response to the second fastening unit being separated from the first fastening unit.

20 Claims, 24 Drawing Sheets

(56) References Cited

U.S. PATENT DOCUMENTS

| | | | | |
|---|---|---|---|---|
| 2023/0242187 A1* | 8/2023 | Woo | ........................ | B62D 27/02 |
| 2023/0344300 A1* | 10/2023 | Schuller-Rach | ........ | F16C 19/06 |
| 2024/0059354 A1* | 2/2024 | Woo | ........................ | B62D 24/02 |
| 2024/0425129 A1* | 12/2024 | Stewart | ................ | B62D 65/024 |

* cited by examiner

FASTENING APPARATUS FOR VEHICLE

CROSS-REFERENCE TO RELATED APPLICATION

This application claims the benefit under 35 USC § 119(a) of Korean Patent Application Nos. 10-2021-0110900 and 10-2021-0110897, filed on Aug. 23, 2021, the entire disclosure of which is incorporated herein by reference for all purposes.

BACKGROUND

1. Field

Embodiments of the present disclosure relate to a fastening apparatus for a vehicle and, more particularly, to a fastening apparatus for a vehicle, the apparatus being capable of easily mounting or separating a top hat or a battery module on and from a chassis frame of a purpose-built vehicle (PBV).

2. Description of Related Art

Generally, purpose-built vehicles (PBVs) mean future-oriented vehicles in which, with the development of autonomous traveling technology, an in-vehicle space is freely utilized suitably for an application to provide customized services necessary to a user during a traveling time to a destination.

These PBVs have a structure where a top hat designed suitably for a user's intended purpose, that is, an upper portion of a vehicle frame, is combined with a skateboard-shaped chassis frame underneath which a battery module is widely arranged. Accordingly, there is a need for development of a novel fastening structure where the top hat or the battery module can be easily separated, for replacement, from the vehicle chassis frame and where assembly automation can be realized.

An example of the related art is disclosed in Korean Patent Application Publication No. 10-2021-0077367 published on Jun. 25, 2021 and entitled "Vehicle Body Assembly Structure".

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a fastening apparatus for a vehicle, including a first fastening unit fixed to a first structure, a casing fixed to a second structure and configured to face the first fastening unit, a moving unit installed inside the casing, and the moving unit being configured to ascend and descend, a second fastening unit rotatably combined with the moving unit and being configured to be fastened to or separated from the first fastening unit according to a rotational direction, and a restoration unit being configured to restore the moving unit to an initial position thereof, in response to the second fastening unit being separated from the first fastening unit.

The first fastening unit may include a stationary portion fixed on an internal surface of the first structure, an extension portion extending from the stationary portion and out of the first structure, a screw threshold being formed on an outer circumferential surface of the extension portion, and an entry guidance portion extending from the extension portion and being configured to guide the extension portion in entering the second fastening unit.

The fastening apparatus may include an assembly unit extending the casing and detachably combined with the second structure, a guide rail protruding from an inner circumferential surface of the casing and being configured to support the moving unit inside the casing to ascend and descend, and a separation prevention unit extending from the casing and preventing the restoration unit from being separated from the casing.

The fastening apparatus may include a hole formed in the separation prevention unit, the hole configured to accept a working tool into the hole-dedicated hole.

The restoration unit may include an elastic member installed between the casing and the moving unit, the elastic member being expandable and contractable along a lengthwise direction thereof, and one pair of pads fixed to the moving unit and the casing, respectively, and supporting both sides of the elastic member, respectively.

Each of the one pair of pads may include a pad body arranged to face an end portion of the elastic member, a seating portion formed by concavely recessing an external face of the pad body inward, the end portion of the elastic member being seated on the seating portion, and an insertion portion configured to prevent the elastic member from being separated from the seating portion.

The insertion portion may extend along a circumferential direction of the pad body, the end portion of the elastic member being inserted into the insertion portion.

The pad may include a rotation prevention portion protruding from the pad body to prevent rotation of the pad body.

The moving unit may include a moving body installed inside the casing, the second fastening unit being inserted into the moving body, a guide portion extending from an outer circumferential surface of the moving body and connected in a slidably movable manner to the casing, and a support portion extending from an inner circumferential surface of the moving body and rotatably supporting the second fastening unit.

The inner circumferential surface of the moving body may be spaced at a distance from an inner circumferential surface of the second fastening unit.

The second fastening unit may include a body portion inserted into the moving body, a screw thread being provided on an inner circumferential surface of the body portion, a tool connection portion extending from the body portion being configured to connect to a working tool, and a hooking portion extending from the body portion and being combined with the support portion in a manner that is hooked thereon.

An upper end portion of the hooking portion may extend outward in a radial direction of the body portion.

In another general aspect, there is provided a fastening apparatus for a vehicle, including a first fastening unit fixed to a first structure, a casing fixed to a second structure and configured to face the first fastening unit, a moving unit installed inside the casing, and the moving unit being configured to ascend and descend, a second fastening unit rotatably installed inside the casing and being configured to be fastened to or separated from the first fastening unit according to a rotational direction thereof, and a bearing unit provided between the moving unit and the second fastening unit and, being configured to rotatably support the second fastening unit with respect to the moving unit.

The bearing unit may include a pair of races arranged between the moving unit and the second fastening unit, the pair of races being separably connected to each other, and a plurality of bearings rotatably installed between the pair of races and being brought into contact with the moving unit and the second fastening unit in a rolling manner.

The pair of races may include a plurality of accommodation portions arranged to be spaced apart, the plurality of bearings being accommodated in the plurality of accommodation portions, respectively, and a plurality of assembly units, each of the plurality of assembly units being arranged between each of the plurality of adjacent accommodation portions, a fixation member being inserted into the plurality of assembly units in a manner that passes therethrough.

The accommodation portion and the assembly unit may be alternately arranged along a circumferential direction of the race.

The accommodation portion and the assembly unit may extend to form a concave-convex shape along a circumferential direction of the race.

The moving unit may include a moving body installed inside the casing, a guide portion arranged on an outer circumferential surface of the moving body and connected to a guide rail provided on an inner circumferential surface of the casing in a slidably movable manner, and a first groove formed by concavely recessing an inner circumferential surface of the moving body, and one side of the bearing unit being inserted into the first groove.

The moving body may have a polygonal cross section.

The second fastening unit may include a body portion pressed into the inner circumferential surface of the moving body, a second groove formed by concavely recessing an outer circumferential surface of the body portion, the other side of the bearing unit being inserted into the second groove, and a tool connection portion extending from the body portion and configured to be connected to a working tool.

Other features and aspects will be apparent from the following detailed description, the drawings, and the claims.

Figure 1:
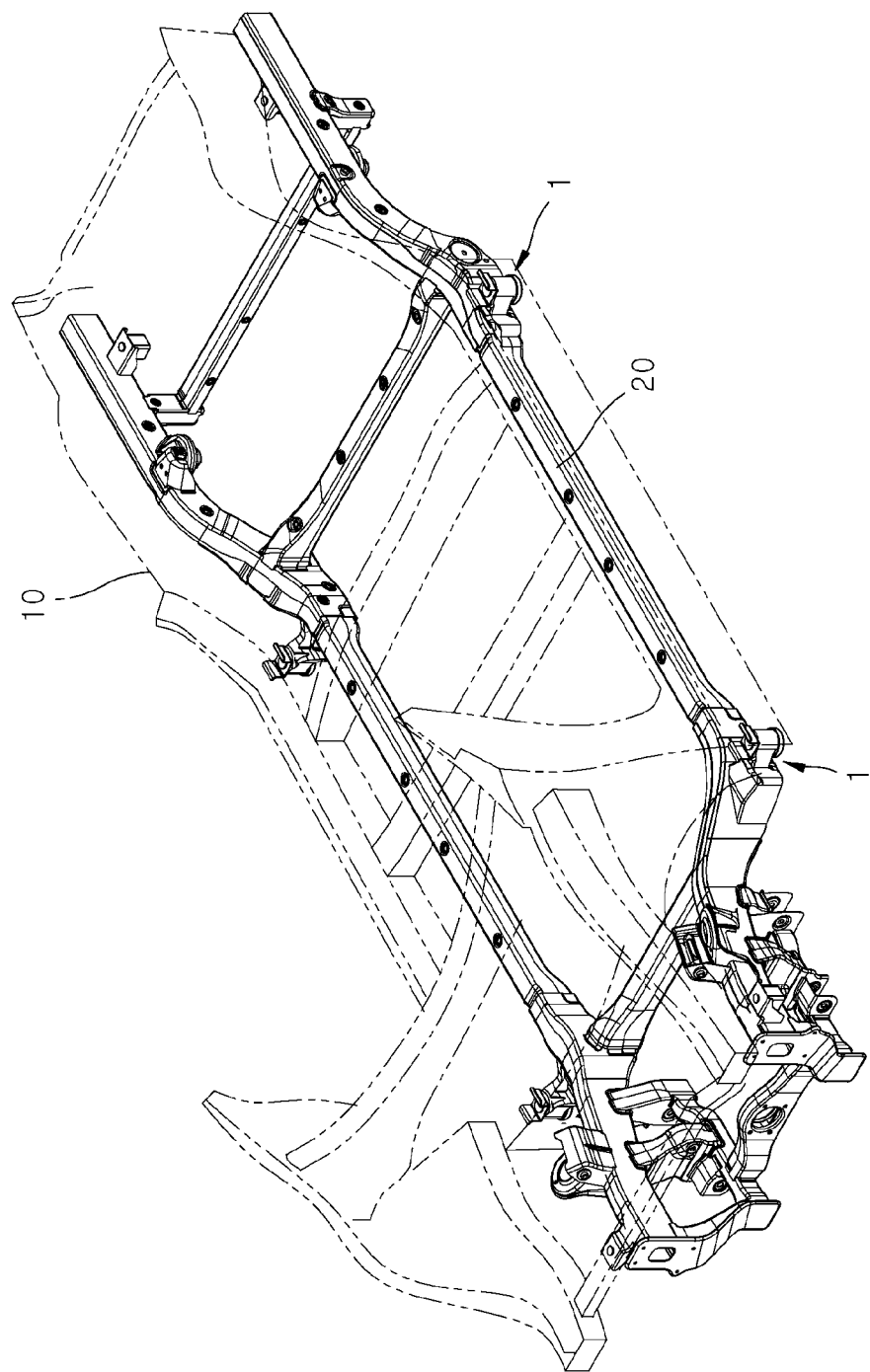
FIG. 1 is a view schematically illustrating a state where a fastening apparatus for a vehicle according to a first embodiment of the present disclosure is installed.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF THE ILLUSTRATED EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

A fastening apparatus for a vehicle according to an embodiment of the present disclosure will be described below with reference to the accompanying drawings.

For clarity and convenience in description, the thicknesses of lines and the sizes of constituent elements may be exaggeratedly illustrated in the drawings. In addition, a term defined by considering a function of a constituent element according to the present disclosure to which the term is assigned will be used below and may vary according to the user's or manager's intention or to practices in the art. Therefore, the term should be defined in context in light of the present specification.

In addition, a constituent element, when referred to as "being connected to (or making contact with)" one other constituent element, may "be directly connected to (or make direct contact with)" one other constituent element or may "be indirectly connected to (or make indirect contact with)" one other constituent element with an intervening constituent element in between. Unless otherwise particularly described, the expression like "an apparatus includes (has) a constituent element," when used throughout the specification, means that an apparatus may "further include (or have)" any other constituent element, not meaning that an apparatus excludes any other constituent element.

The same reference numeral throughout the present specification may refer to the same constituent element. The same reference numerals or similar reference numerals, although not shown in a specific drawing, may be used for description with reference to another drawing. In addition, a constituent element, although not given a reference numeral in a specific drawing, may be described with reference to another drawing. In addition, the number of, shapes of, and sizes, of constituent elements illustrated in the drawing of the present application and a relative difference between the sizes are defined to provide a convenient basis for understanding the present disclosure, without imposing any limitation on embodiments, and may be defined in various ways.

Figure 2:
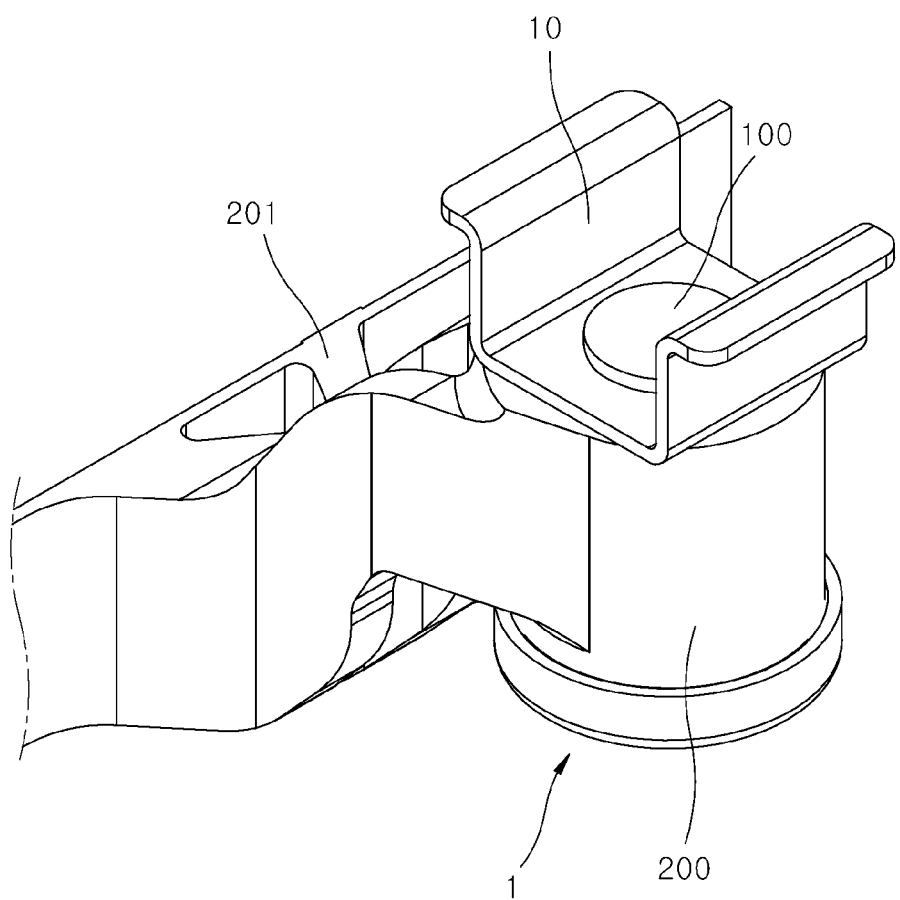
FIG. 2 is a perspective view schematically illustrating a configuration of the fastening apparatus for a vehicle according to the first embodiment of the present disclosure.
Figure 3:
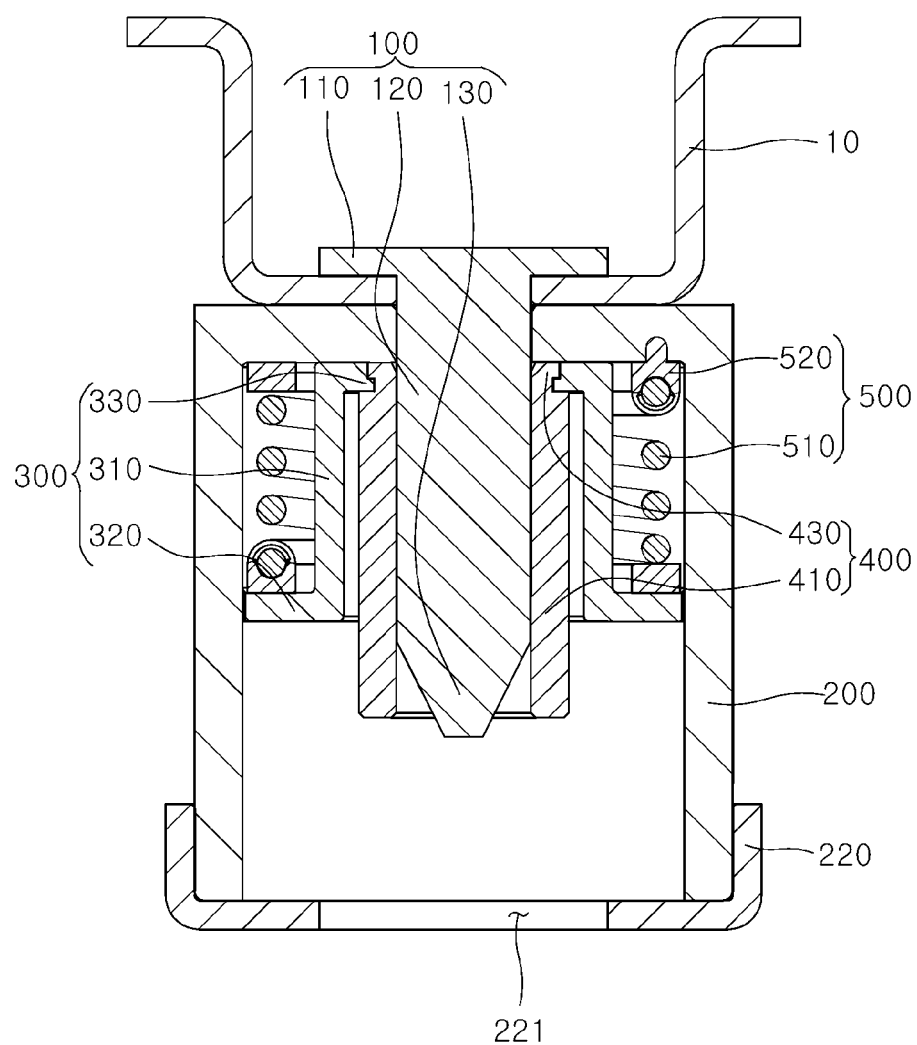
FIG. 3 is a cross-sectional view schematically illustrating the configuration of the fastening apparatus for a vehicle according to the first embodiment of the present disclosure.
Figure 4:
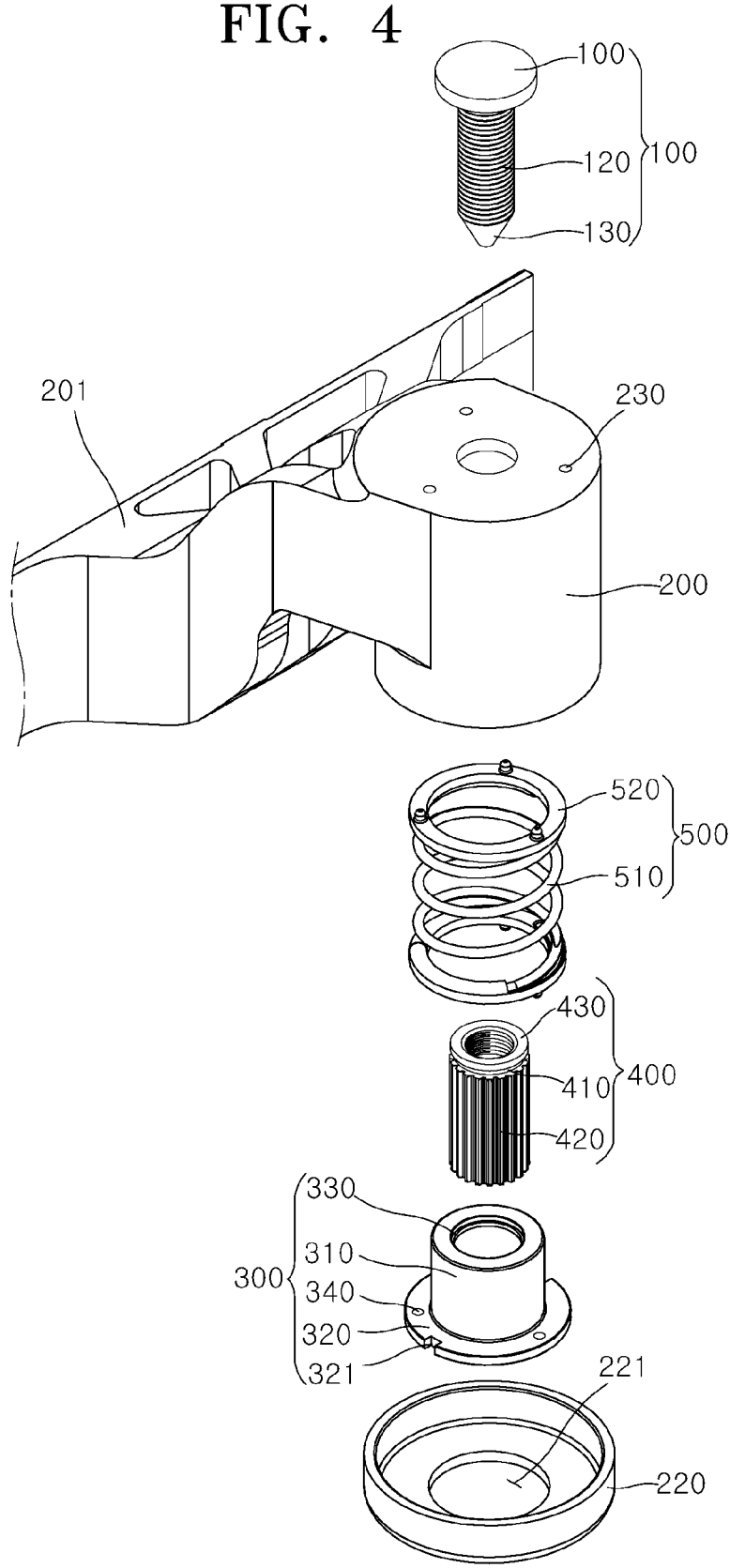
FIG. 4 is an exploded perspective view schematically illustrating the configuration of the fastening apparatus for a vehicle according to the first embodiment of the present disclosure.

FIG. 1 is a view schematically illustrating a state where a fastening apparatus for a vehicle according to a first embodiment of the present disclosure is installed. FIG. 2 is a perspective view schematically illustrating a configuration of the fastening apparatus for a vehicle according to the first embodiment of the present disclosure. FIG. 3 is a cross-sectional view schematically illustrating the configuration of the fastening apparatus for a vehicle according to the first embodiment of the present disclosure. FIG. 4 is an exploded perspective view schematically illustrating the configuration of the fastening apparatus for a vehicle according to the first embodiment of the present disclosure.

With reference to FIGS. 1 to 4, a fastening apparatus 1 for a vehicle according to the first embodiment of the present disclosure includes a first fastening unit 100, a casing 200, a moving unit 300, a second fastening unit 400, and a restoration unit 500.

A first structure 10 and a second structure 20 that will be described below may be exemplified by a top hat and a chassis frame, respectively. The top hat corresponds to a vehicle frame. The chassis frame is installed under a vehicle body and structurally supports the vehicle body. The top hat and the chassis frame can be customized and replaced according to a user's purpose. However, the first structure 10 and the second structure 20 are not limited thereto. It is possible that the first structure 10 and the second structure 20 are variously design-changed to different structures, respectively, for example, a chassis frame and a battery module, which can be fastened to, and separated from each other in the vehicle.

The first fastening unit 100 is fixed to the first structure 10 and is fastened to the second fastening unit 400 described below. Thus, the first fastening unit 100 fixes the second structure 20 and the first structure 10 with respect to each other.

Figure 5:
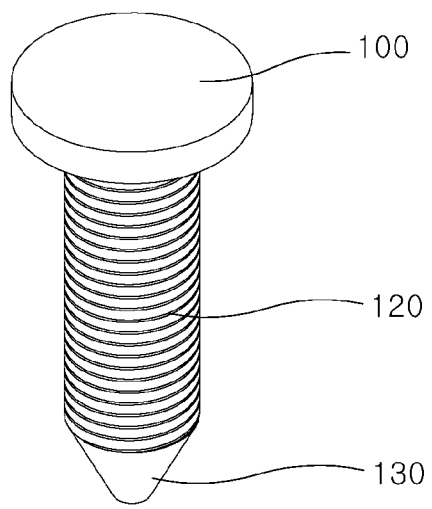
FIG. 5 is a perspective view schematically illustrating a configuration of a first fastening unit according to the first embodiment of the present disclosure.

FIG. 5 is a perspective view schematically illustrating a configuration of the first fastening unit according to the first embodiment of the present disclosure.

With reference to FIGS. 1 to 5, the first fastening unit 100 according to the first embodiment of the present disclosure includes a stationary portion 110, an extension portion 120, and an entry guidance portion 130.

The stationary portion 110 forms an exterior appearance of an upper portion of the first fastening unit 100 according to the first embodiment of the present disclosure and supports both the extension portion 120 and the entry guidance portion 130 that will be described below. The stationary portion 110 according to the first embodiment of the present disclosure is seated on an internal surface of the first structure 10 for being fixed thereto. The stationary portion 110 may be welded to or adhered to the internal surface of the first structure 10 and thus may be integrally formed with the first structure 10. It is possible that in addition to a circular shape illustrated in FIG. 5, the stationary portion 110 is design-changed to various specific shapes in such a manner as to be seated on the internal surface of the first structure 10 for being fixable thereto.

The extension portion 120 extends from the stationary portion 110 and forms an exterior appearance of a center portion of the first fastening unit 100 according to the first embodiment of the present disclosure. The extension portion 120 according to the first embodiment of the present disclosure may be formed in the shape of a bar in such a manner as to vertically extend downward from an internal surface of the stationary portion 110. The extension portion 120 passes through the internal surface of the first structure 10 and extends out of the first structure 10. A screw thread is formed, along a lengthwise direction thereof, on an outer circumferential surface of the extension portion 120 in such a manner that the extension portion 120 is combined, in a nut-bolt fastening manner, with the second fastening unit 400 described below.

The entry guidance portion 130 extends from the extension portion 120 and forms an exterior appearance of a lower portion of the first fastening unit 100 according to the first embodiment of the present disclosure. The entry guidance portion 130 is provided in such a manner as to be able to guide the extension portion 120 in entering the second fastening unit 400 when the first fastening unit 100 and the second fastening unit 400 are fastened to each other. The entry guidance portion 130 according to the first embodiment of the present disclosure extends vertically downward from a lower end portion of the extension portion 120. The entry guidance portion 130 is provided in such a manner that the width thereof decreases toward the end thereof. Accordingly, the entry guidance portion 130 may be formed in such a manner as to have a substantially conical shape.

The casing 200 is fixed to the second structure 20 and is arranged in a manner that faces the first fastening unit 100. The casing 200 supports both the moving unit 300 and the restoration unit 500 that will be described below. The casing 200, as illustrated in FIGS. 2 and 3, may be directly fixed to the second structure 20. It is also possible that the casing 200 is fixed to a bracket or the like that is separately provided on the second structure 20.

Figure 6A:
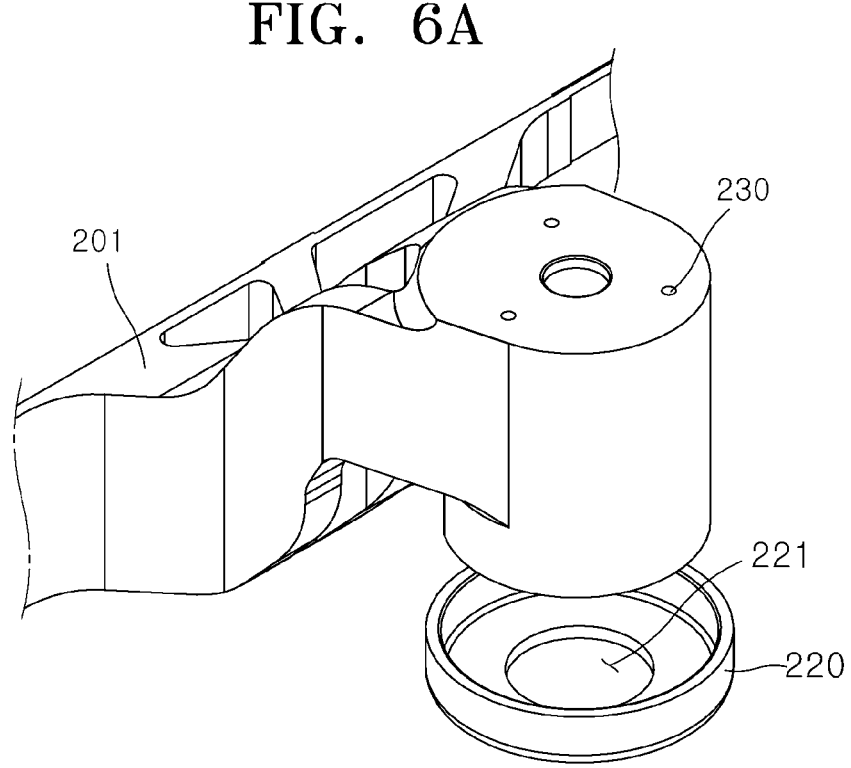
FIGS. 6A and 6B are a perspective view schematically illustrating a configuration of a casing according to the first embodiment of the present disclosure.
Figure 6B:
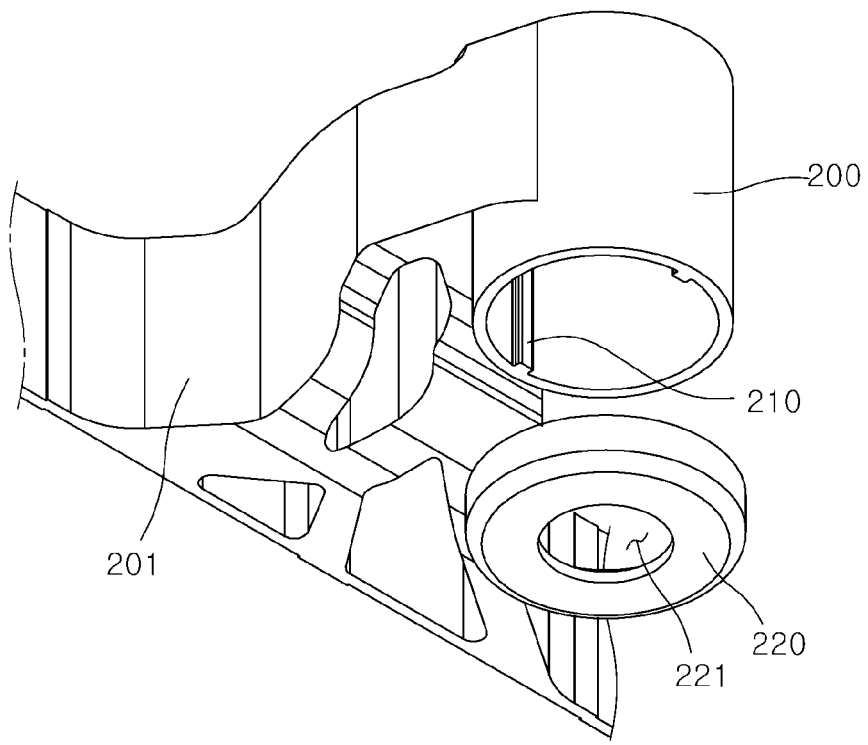

FIGS. 6A and 6B is a perspective view schematically illustrating a configuration of the casing 200 according to the first embodiment of the present disclosure.

With reference to FIGS. 1 to 6B, the casing 200 according to the first embodiment of the present disclosure may be formed in such a manner as to have the shape of a hollow box that are open at the upper end and the lower end. The casing 200 may be combined with a lateral surface of the second structure 20 by an assembly unit 201 that extends from one side of the casing 200. The assembly unit 201 may be integrally combined with the second structure 20 by welding, adhesion, and the like. It is also possible that the assembly unit 201 is detachably attached to the second structure 20 by bolting or the like. The casing 200 is arranged in such a manner that an upper surface thereof faces an end portion of the first fastening unit 100 fixed to the first structure 10, that is, a lower end portion of the entry guidance portion 130.

A guide rail 210 may be provided inside the casing 200. The guide rail 210 supports the moving unit 300 inside the casing 200 in a manner that is enabled to ascend and descend. The guide rail 210 according to the first embodiment of the present disclosure protrudes vertically from an inner circumferential surface of the casing 200 toward an internal space in the casing 200. However, the guide rail 210 is not limited to this shape. It is also possible that the guide rail 210 is formed in the shape of a groove by concavely recessing the inner circumferential surface of the casing 200 toward an outer circumferential surface of the casing 200 according to the shape of a guide portion 320 provided on the moving unit 300 described below. The guide rail 210 extends in such a manner that a lengthwise direction thereof is parallel with a lengthwise direction of the casing 200. A plurality of guide rails 210 may be provided. In this case, the plurality of guide rails 210 may be arranged to be spaced a distance apart along the inner circumferential surface of the casing 200.

A separation prevention unit 220 may be provided on a lower end portion of the casing 200. The separation prevention unit 220 prevents the moving unit 300 and the restoration unit 500, which will be described below, from being separated from the inside of the casing 200. The separation prevention unit 220 according to the first embodiment of the present disclosure may be formed in such a manner as to have the shape of a plate that extends horizontally from an edge of the lower end portion of the casing 200 toward the central axis of the casing 200. The separation prevention unit 220 may be integrally formed with the casing 200. As illustrated in FIGS. 2 and 3, it is also possible that the separation prevention unit 220 is manufactured separately from the casing 200 and is separably connected to the casing 200. A tool-dedicated hole 221 is formed in a center portion of the separation prevention unit 220 in a manner that passes through the separation prevention unit 220 vertically in the upward-downward direction, so that a working tool 30, such as a motor-driven drill or a socket wrench, can enter the tool-dedicated hole 221.

A first rotation prevention groove 230 may be formed in an upper surface of the casing 200. The first rotation prevention groove 230 prevents rotation of the restoration unit 500 described below. The first rotation prevention groove 230 according to the first embodiment of the present disclosure may be formed in such a manner as to have the shape of a hole that passes in the upward-downward direction through the upper surface of the casing 200. A plurality of first rotation prevention grooves 230 may be formed. The first rotation prevention grooves 230 may be arranged to be spaced a predetermined distance apart along a circumferential direction of the casing 200.

The moving unit 300 is installed inside the casing 200 in a manner that is enabled to ascend and descend.

Figure 7:
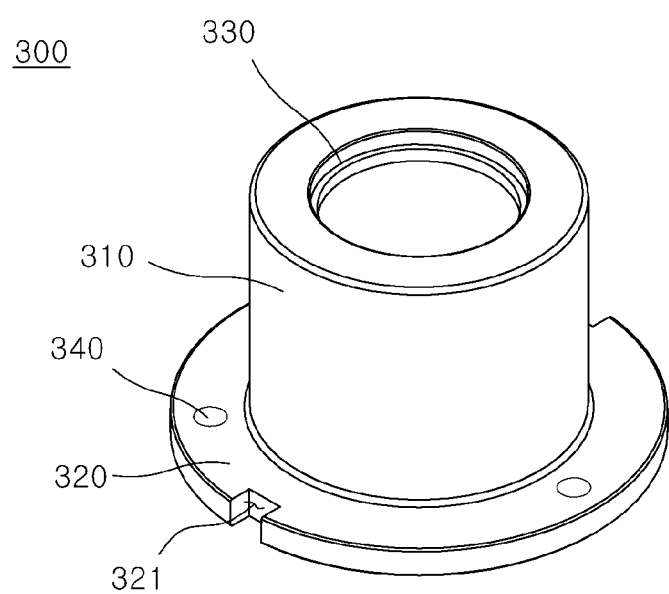
FIG. 7 is a perspective view schematically illustrating a configuration of a moving unit according to the first embodiment of the present disclosure.

FIG. 7 is a perspective view schematically illustrating a configuration of a moving unit according to the first embodiment of the present disclosure.

With reference to FIGS. 1 to 7, the moving unit 300 according to the first embodiment of the present disclosure includes a moving body 310, the guide portion 320, a support portion 330, and a second rotation prevention groove 340.

The moving body 310 forms a schematic exterior appearance of the moving unit 300 according to the first embodiment of the present disclosure and supports all the guide portion 320, the support portion 330, and the second rotation prevention groove 340 that will be described below. The moving body 310 according to the first embodiment of the present disclosure is formed in the shape of a hollow cylinder in such a manner that an insertion hole 311 is formed in a center portion thereof. The moving body 310 is installed inside the casing 200. An outer circumferential surface of the moving body 310 is arranged to be spaced a predetermined distance away from the inner circumferential surface of the casing 200 in such a manner that the moving body 310 is enabled to smoothly ascend and descend inside the casing 200.

The guide portion 320 extends from the outer circumferential surface of the moving body 310 and is connected, in a slidably movable manner, to the guide rail 210 provided on the inner circumferential surface of the casing 200. The guide portion 320 according to the first embodiment of the present disclosure may be formed in the shape of a circular plate in such a manner as to horizontally extend in a radial direction of the moving body 310 from an outer circumferential surface of a lower end portion of the moving body 310. The guide portion 320 is formed in such a manner as to have a greater diameter than the tool-dedicated hole 221. Accordingly, the guide portion 320 can be prevented from being separated out of the casing 200 because an internal surface of the guide portion 320 is brought into contact with an upper surface of the separation prevention unit 220. The working tool 30 can be prevented from being brought into direct contact with the restoration unit 500 described below. The guide portion 320 is connected to the guide rail in a slidable movable manner using a guide groove 321 formed in an outer circumferential surface of the guide portion 320.

The guide groove 321 may be a groove that is formed by concavely recessing the outer circumferential surface of the moving body 310 toward the central axis of the moving body 310. The guide groove 321 may be formed in such a manner that a cross section thereof corresponds to a cross section of the guide rail 210. A plurality of guide portions 321 may be provided and may be arranged to be spaced a distance apart along the outer circumferential surface of the moving body 310. The guide rail 210 protruding from the inner circumferential surface of the casing 200 is inserted into the guide groove 321. The moving body 310 moves slidably along the lengthwise direction of the guide rail 210. The moving body 310 is supported on the guide groove 321 in a manner that is enabled to ascend and descend with respect to the casing 200. However, the guide groove 321 is not limited to this shape. In a case where the guide rail 210 is formed by concavely recessing the inner circumferential surface of the casing 200, it is also possible that the guide rail 210 is formed in a manner that protrudes from the outer circumferential surface of the moving body 310.

The support portion 330 extends from the inner circumferential surface of the moving body 310 and rotatably supports the second fastening unit 400 described below. The support portion 330 according to the first embodiment of the present disclosure may be formed in the shape of a ring in such a manner as to extend horizontally in the radial direction of the moving body 310 inward from an inner circumferential surface of an upper end portion of the moving body 310. The support portion 330 is formed in such a manner as to have the same shape of a cross section as a staircase, so that the support portion 330 may be combined with a hooking portion 430 described below in a manner that is hooked thereon. That is, the support portion 330 may be formed in such a manner that a lower end portion thereof extends a longer distance toward the central axis of the moving body 310 than an upper end portion thereof.

The second rotation prevention groove 340 is formed in the guide portion 320 in a manner that passes therethrough and prevents the rotation of the restoration unit 500 described below. The second rotation prevention groove 340 according to the first embodiment of the present disclosure may be formed in the shape of a hole in such a manner as to pass in the upward-downward direction through the guide portion 320. A plurality of second rotation prevention grooves 340 may be formed. The plurality of second rotation prevention grooves 340 are arranged to be spaced a predetermined distance apart along a circumferential direction of the guide portion 320.

The second fastening unit 400 is rotatably combined with the moving unit 300 and, according to a rotational direction, is fastened to or separated from the first fastening unit 100. That is, the second fastening unit 400 is enabled to ascend and descend together with the moving unit 300 and at the same time is combined with the moving unit 300 in such a manner as to be rotatably relative to the moving unit 300.

Figure 8:
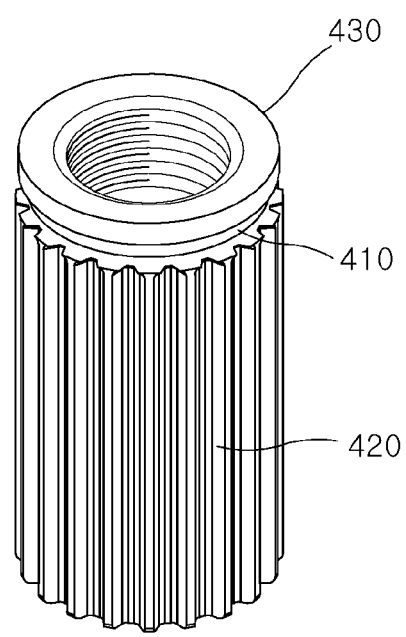
FIG. 8 is a perspective view schematically illustrating a configuration of a second fastening unit according to the first embodiment of the present disclosure.

FIG. 8 is a perspective view schematically illustrating a configuration of the second fastening unit according to the first embodiment of the present disclosure.

With reference to FIGS. 1 to 8, the second fastening unit 400 according to the first embodiment of the present disclosure includes a body portion 410, a tool connection portion 420, and the hooking portion 430.

The body portion 410 according to the first embodiment of the present disclosure is formed in such a manner as to have the shape of a hollow cylinder and is inserted into the insertion hole 311 formed in a center portion of the moving body 310. The body portion 410 is formed in such a manner as to have a smaller diameter than the insertion hole 311 and is arranged in such a manner that an outer circumferential surface thereof is a predetermined distance away from the inner circumferential surface of the moving body 310. Accordingly, the body portion 410 may be smoothly rotated without particular interfering inside the moving body 310. A screw thread is provided on an inner circumferential surface of the body portion 410. The screw thread is combined by a bolt-and-nut mechanism with the extension portion 120. The body portion 410 is formed to have such a length that a lower end portion thereof protrudes downward from the moving body 310. Accordingly, the body portion 410 can improve the accessibility of the working tool 30 to the tool connection portion 420 described below.

The tool connection portion 420 extends from the body portion 410 and is provided in a manner that is connectable to the working tool 30, such as a motor-driven drill or a socket wrench. The tool connection portion 420 according to the first embodiment of the present disclosure may be formed in a saw-toothed shape in such a manner as to protrude from the outer circumferential surface of the body portion 410. Accordingly, the tool connection portion 420 may be easily connected to the working tool 30 and at the same time may efficiently receive a rotational force from the working tool 30.

The hooking portion 430 extends from the body portion 410 and is combined with the support portion 330 in a manner that is hooked thereon. Thus, the hooking portion 430 rotatably supports the body portion 410.

Figure 9A:
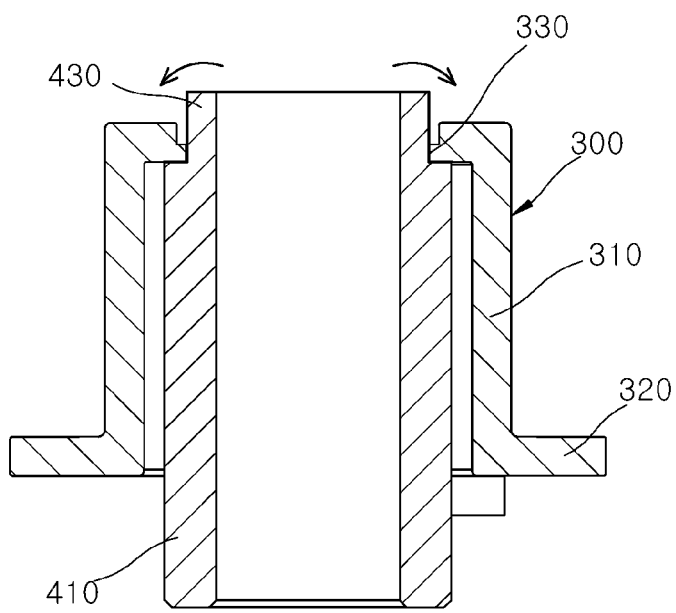
FIGS. 9A and 9B are views each schematically illustrating a process of combining a hooking portion according to the first embodiment of the present disclosure with a support portion.
Figure 9B:
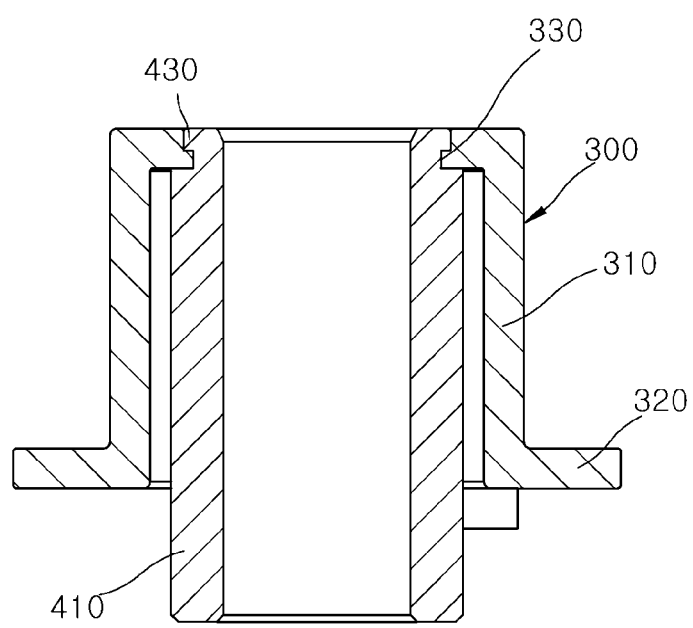

FIGS. 9A and 9B are views schematically illustrating a process of combining the hooking portion 430 according to the first embodiment of the present disclosure with the support portion 330.

With reference to FIGS. 9A and 9B, the hooking portion 430 according to the first embodiment of the present disclosure is initially formed in such a manner as to have the shape of a hollow cylinder and extends vertically upward from an upper end portion of the body portion 410.

In this case, the hooking portion 430 is formed in such a manner that an outer circumferential surface thereof has a smaller diameter than an inner circumferential surface of the support portion 330, so that the hooking portion 430 may pass through the support portion 330 for being inserted thereinto.

An upper end portion of the hooking portion 430 that passes through the support portion 330 for being inserted thereinto is arranged in such a manner as to protrude upward from the moving body 310.

Subsequently, the hooking portion 430 is formed to be bent in such a manner that the upper end portion thereof extends outward in the radial direction of the body portion 410. Accordingly, the hooking portion 430 is bent in such a manner as to have a vertical cross section in the shape of substantially the Korean letter "ㄱ".

Accordingly, a lower end portion of the support portion 330 is arranged in such a manner as to be inserted into a space between a lower surface of the upper end portion of the hooking portion 430 and an upper surface of the upper end portion of the body portion 410. In this case, the hooking portion 430 and the body portion 410 are arranged in such a manner that the lower surface of the upper end portion of the hooking portion 430 and the upper surface of the upper end portion of the body portion 410 face each other with a predetermined distance between each of the lower surface and the upper surface and the lower end portion of the support portion 330.

Accordingly, the support portion 330 and the hooking portion 430 may support the body portion 410 in a state where the body portion 410 is enabled to ascend and descend together with the moving body 310 and at the same time is rotatable relative to the moving body 310.

When the second fastening unit 400 is separated from the first fastening unit 100, the restoration unit 500 restores the moving unit 300 to an initial position thereof. Accordingly, when the first fastening unit 100 and the second fastening unit 400 are repeatedly fastened, the restoration unit 500 may secure the consistent assembly performance.

Figure 10:
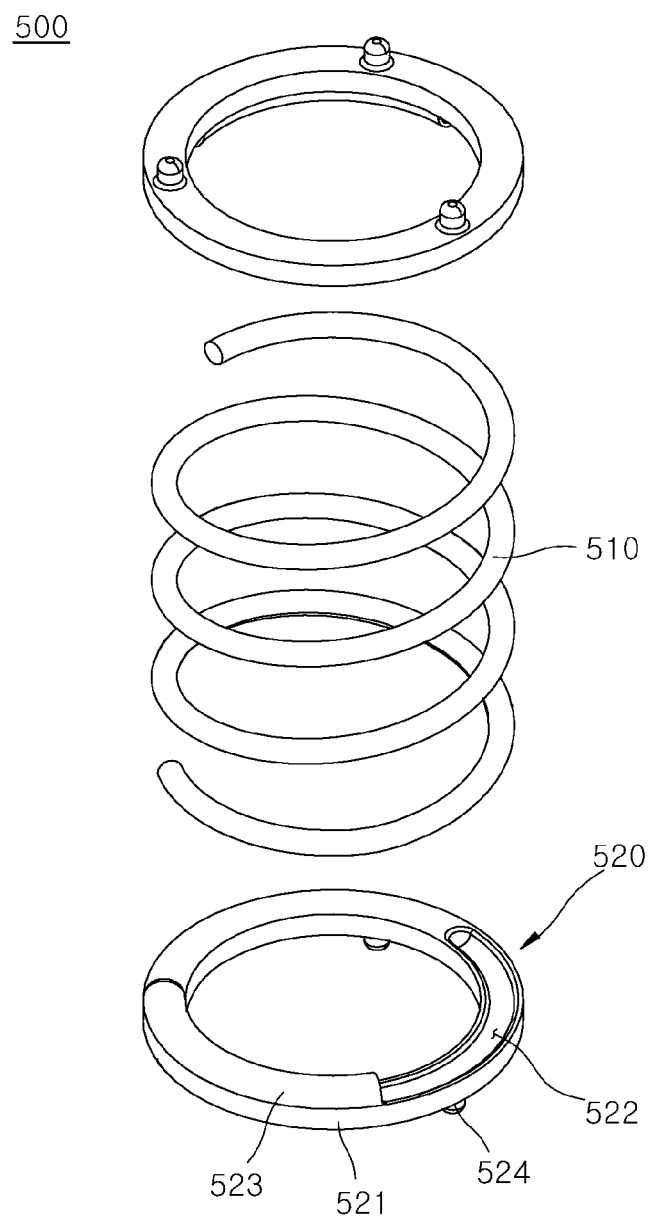
FIG. 10 is a perspective view schematically illustrating a configuration of a restoration unit according to the first embodiment of the present disclosure.

FIG. 10 is a perspective view schematically illustrating a configuration of the restoration unit 500 according to the first embodiment of the present disclosure.

With reference to FIGS. 1 to 10, the restoration unit 500 according to the first embodiment of the present disclosure includes an elastic member 510 and a pad 520.

The elastic member 510 is installed between the casing 200 and the moving unit 300 and elastically supports the moving unit 300 with respect to the casing 200. The elastic member 510 according to the first embodiment of the present disclosure may be formed in the shape of a coil spring in such a manner as to be provided along a lengthwise direction thereof in an expandable and contractable manner. The elastic member 510 is arranged in such a manner that the lengthwise direction thereof is parallel with the lengthwise direction of the casing 200. The elastic member 510 is arranged in such a manner that both end portions thereof face an upper surface of the guide portion 320 and an internal surface of an upper portion of the casing 200, respectively. The elastic member 510 may be formed in such a manner that, in a case where the moving unit 300 is arranged at an initial position thereof, a length of the elastic member 510 corresponds to a distance between the upper surface of the guide portion 320 and the internal surface of the upper portion of the casing 200. In this case, it is possible that the initial position of the moving unit 300 is variously design-changed within a range of heights of the moving unit 300 that can be positioned inside the casing 200 in a state where the body portion 410 and the extension portion 120 combined in a nut-bolt fastening manner are disconnected from each other.

The pads 520 are provided in one pair and are fixed to the moving unit 300 and the casing 200, respectively. The pads 520 in one pair support both sides of the elastic member 510 with respect to the moving unit 300 and the casing 200, respectively.

The pad 520 according to the first embodiment of the present disclosure includes a pad body 521, a seating portion 522, an insertion portion 523, and a rotation prevention portion 524.

The pad body 521 forms a schematic exterior appearance of the pad 520 according to the first embodiment of the present disclosure and supports all the seating portion 522, the insertion portion 523, and the rotation prevention portion 524 that will be described below. The pad body 521 according to the first embodiment of the present disclosure may be formed in the shape of a circular ring. The pad body 521 that is to be provided on one pad 520 of the one pair of the pads 520 is arranged in such a manner that an external surface thereof faces the inner surface of the upper portion of the casing 200 and that an internal surface thereof faces an upper end portion of the elastic member 510. The pad body 521 that is to be provided on the other one pad 520 of the one pair of the pads 520 is arranged in such a manner that an external surface thereof faces the upper surface of the guide portion 320 and that an internal surface thereof faces a lower end portion of the elastic member 510.

The seating portion 522 is formed by concavely recessing the external surface of the pad body 521 inward, and the end portion of the elastic member 510 is seated on the seating portion 522. The seating portion 522 according to the first embodiment of the present disclosure may be formed in the shape of a groove by concavely recessing the internal surface of the pad body 521 toward the external surface thereof. The seating portion 522 extends in such a manner that a lengthwise direction thereof is in parallel with a circumferential direction of the pad body 521. The seating portion 522 may be formed in such a manner that a curvature thereof has a value corresponding to a curvature of a coil of the elastic member 510.

The insertion portion 523 is provided in such a manner as to prevent the elastic member 510 seated on the seating portion 522 from being separated from the seating portion 522. The insertion portion 523 according to the first embodiment of the present disclosure may be formed in such a manner that both end portions thereof are integrally connected to edges, respectively, of an inner circumference and an outer circumference of the pad body 521 and that an upper portion of the seating portion 522 is surrounded. The insertion portion 523 extends in a lengthwise direction thereof along the circumferential direction of the pad body 521. The insertion portion 523 is formed to have a space inside, and an end portion of the elastic member 510 is inserted into the space in the insertion portion 523.

The rotation prevention portion 524 protrudes from the pad body 521 in such a manner as to prevent rotation of the pad body 521. The rotation prevention portion 524 according to the first embodiment of the present disclosure may be formed in the shape of a protrusion in such a manner as to vertically protrude from an external surface of the pad body 521. A plurality of rotation prevention portions 524 may be provided and may be arranged to be a predetermined distance apart along the circumferential direction of the pad body 521. The rotation prevention portion 524 formed on the pad body 521 to be provided on one pad 520 of the one pair of the pads 520 is inserted into the first rotation prevention groove 230 that is formed in the upper surface of the casing 200 in a manner that passes therethrough. The rotation prevention portion 524 formed on the pad body 521 to be provided on the other pad 520 of the one pair of the pads 520 is inserted into the second rotation prevention groove 340 that is formed in the guide portion 320 in a manner that passes therethrough.

A process of assembling the fastening apparatus 1 for a vehicle according to the first embodiment of the present disclosure will be described in detail below.

Figure 11:
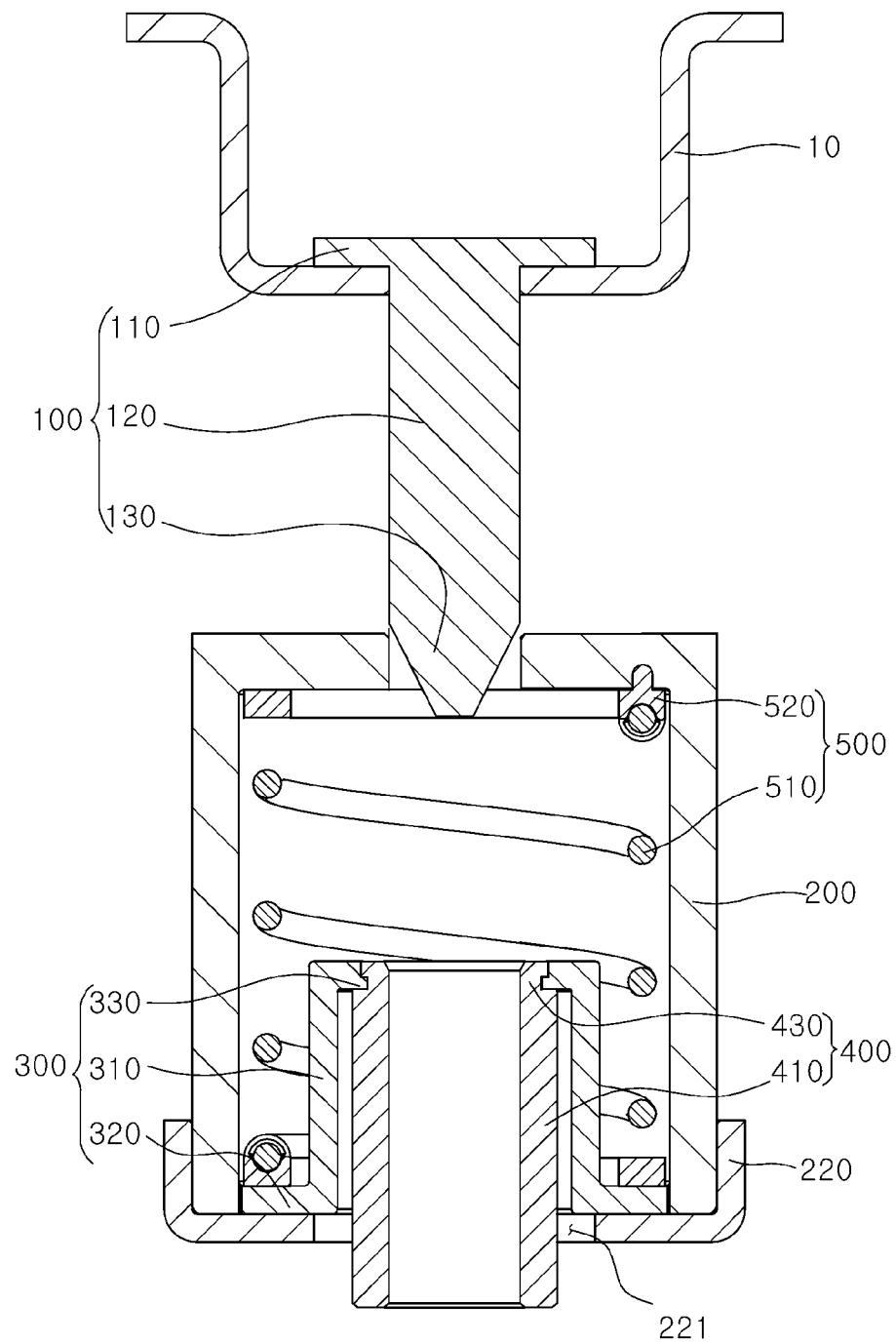
FIGS. 11 to 13 are views each schematically illustrating a process of assembling the fastening apparatus for a vehicle according to the first embodiment of the present disclosure.
Figure 12:
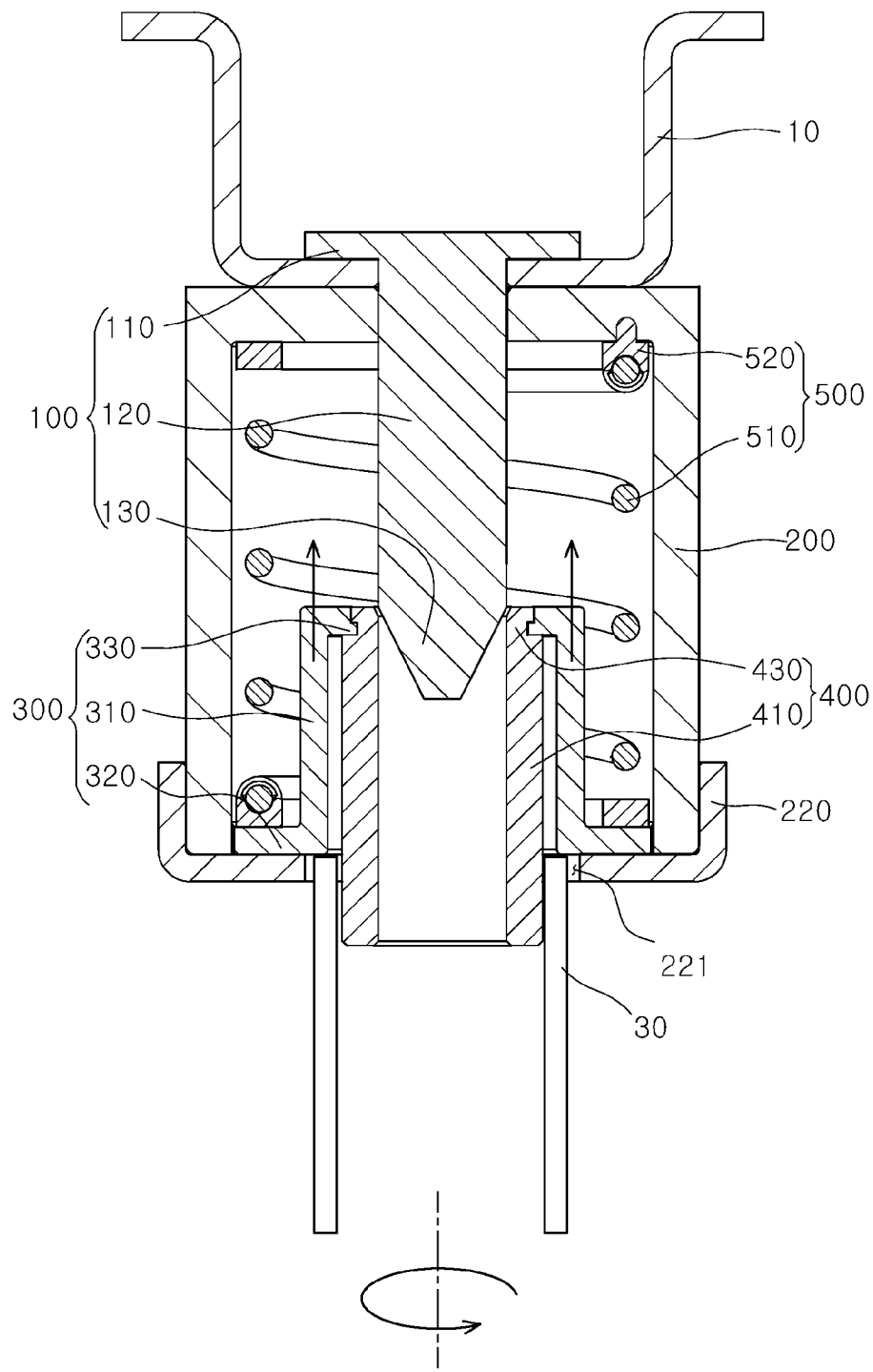
Figure 13:
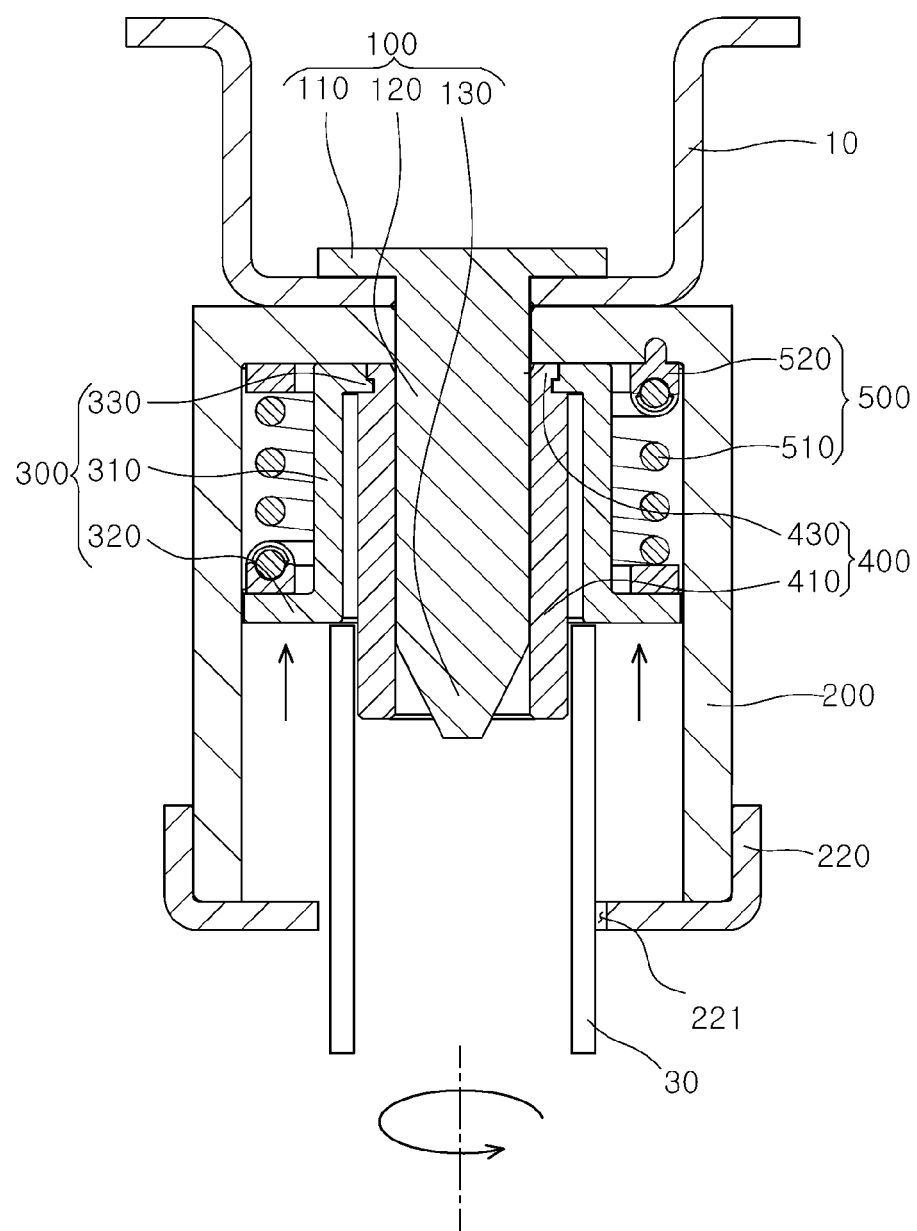

FIGS. 11 to 13 are views each schematically illustrating a process of assembling the fastening apparatus 1 for a vehicle according to the first embodiment of the present disclosure.

With reference to FIGS. 11 to 13, the first structure 10 is seated on the top of the second structure 20, and thus the first fastening unit 100 fastened to the first structure 10 is inserted into the casing 200.

The entry guidance portion 130, together with the moving unit 300, is inserted into the body portion 410 provided on the second fastening unit 400 arranged at an initial position thereof inside the casing 200. In this case, the entry guidance portion 130 is formed in such a manner that a width thereof decreases toward the end thereof. Thus, the entry guidance portion 130 may be smoothly inserted into the body portion 410.

The working tool 30 is connected to the tool connection portion 420 provided on the second fastening unit 400.

The working tool 30 applies a rotational force to the second fastening unit 400 and at the same time pushes upward the moving unit 300. In this cases, the working tool 30 is formed in such a manner than the guide portion 320 has a greater diameter than the tool-dedicated hole 221, and thus direct contact with the elastic member 510 can be prevented.

When the moving unit 300 ascends a predetermined distance, the inner circumferential surface of the body portion 410 is engaged with the outer circumferential surface of the extension portion 120.

The second fastening unit 400 is continuously rotated by the working tool 30, is combined with the first fastening unit 100 in a nut-bolt fastening manner, and, together with the moving unit 300, is moved upward from the casing 200.

In this case, the elastic member 510 contracts in the lengthwise direction thereof and increases an elastic restoring force thereof.

An upper surface of the moving body 310 is brought into contact with an internal surface of the second structure 20, and assembling of the first fastening unit 100 and the second fastening unit 400 is completed.

The first fastening unit 100 and the second fastening unit 400 are separated from each other in the reverse order to the order in which the first fastening unit 100 and the second fastening unit 400, as described above, are fastened to each other.

In this case, when the first fastening unit 100 and the second fastening unit 400 combined in a nut-bolt fastening manner are, the elastic member 510 expands by the increased elastic restoring force in the lengthwise direction thereof. Thus, the moving unit 300 and the second fastening unit 400 are caused to descend, and the moving unit 300 and the second fastening unit 400 returns to respective initial positions thereof.

A process of assembling the fastening apparatus 2 for a vehicle according to the embodiment of the present disclosure will be described in detail below.

Figure 14:
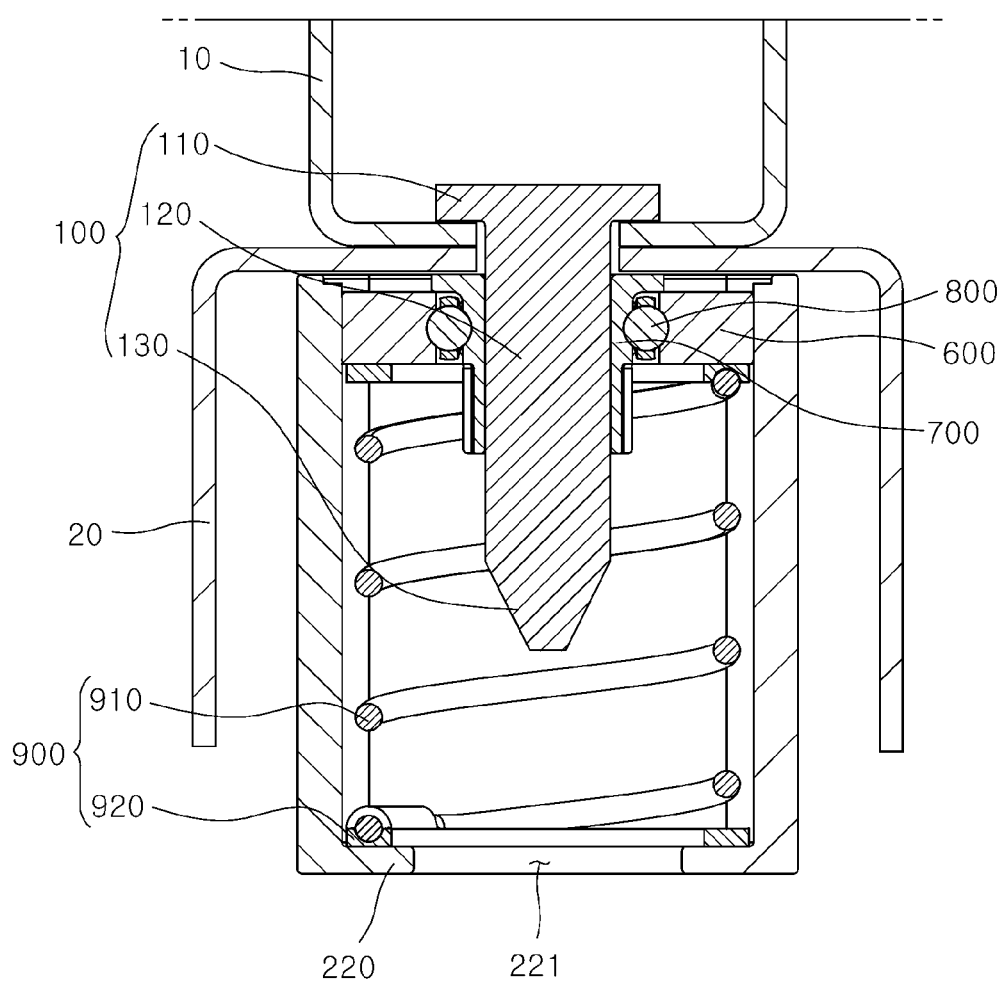
FIG. 14 is a cross-sectional view schematically illustrating a configuration of a fastening apparatus for a vehicle according to a second embodiment of the present disclosure.
Figure 15:
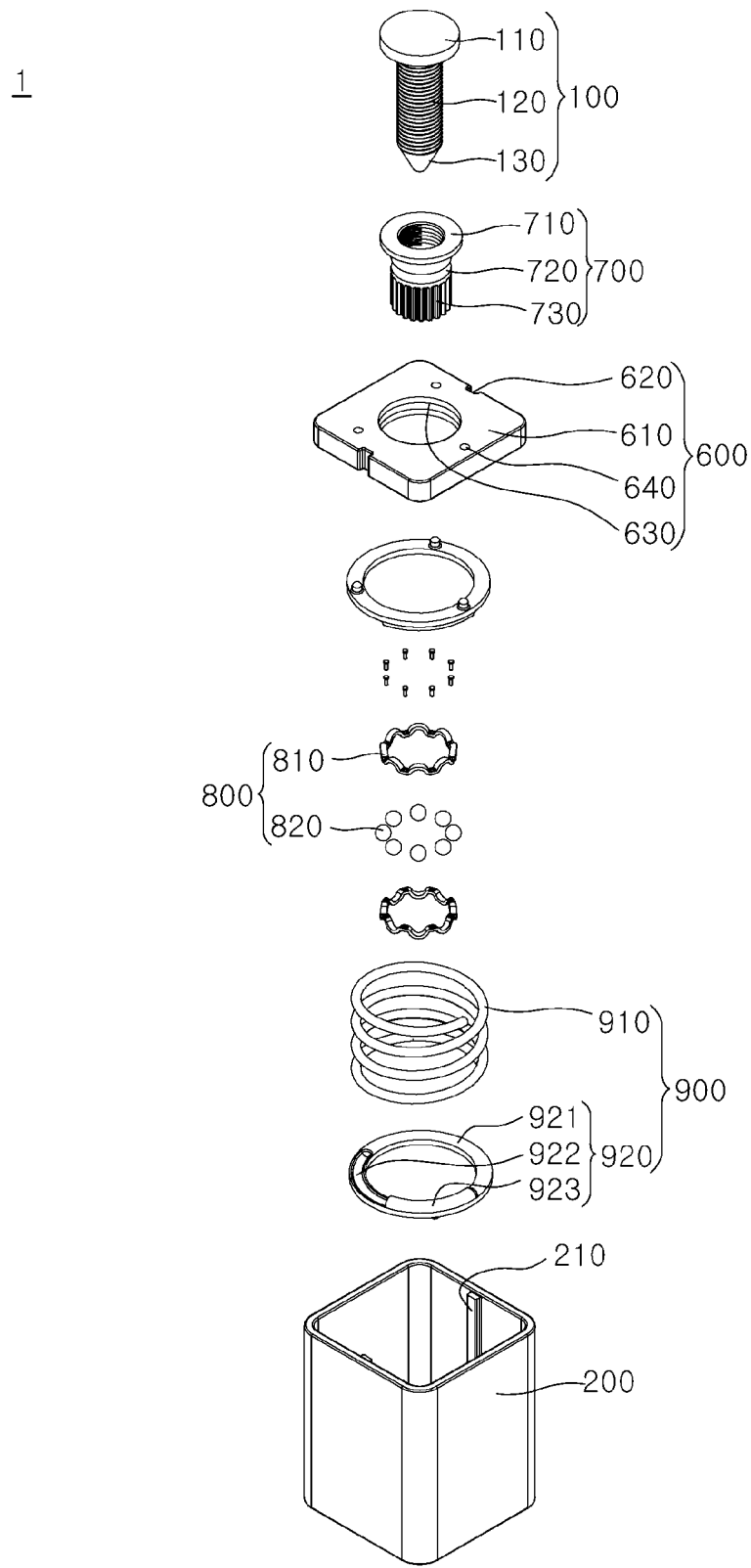
FIG. 15 is an exploded perspective view schematically illustrating the configuration of the fastening apparatus for a vehicle according to the second embodiment of the present disclosure.
Figure 16:
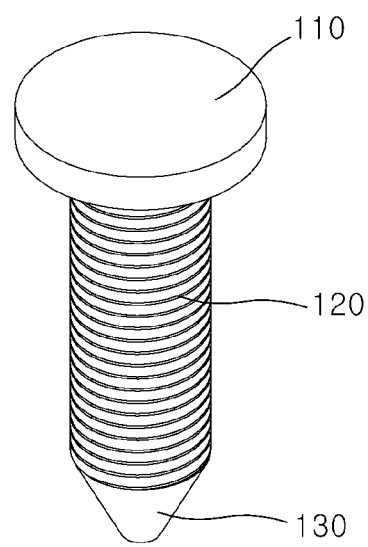
FIG. 16 is a perspective view illustrating schematically illustrating a configuration of a first fastening unit of the second embodiment of the present disclosure.
Figure 17A:
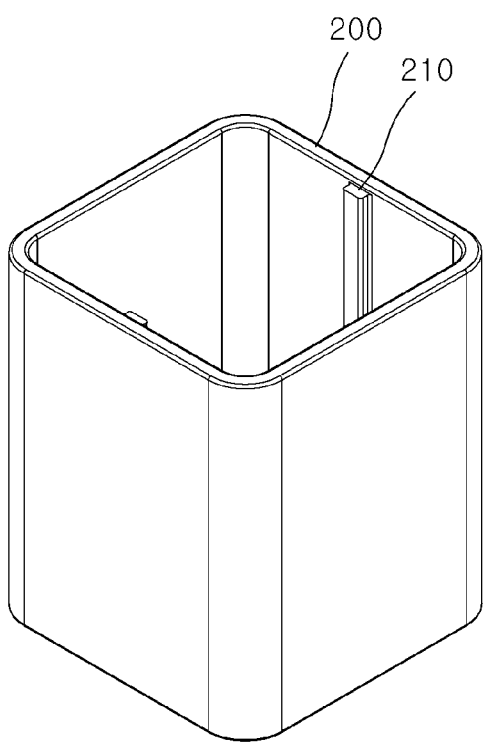
FIGS. 17A and 17B are a perspective view schematically illustrating a configuration of a casing according to the second embodiment of the present disclosure.
Figure 17B:
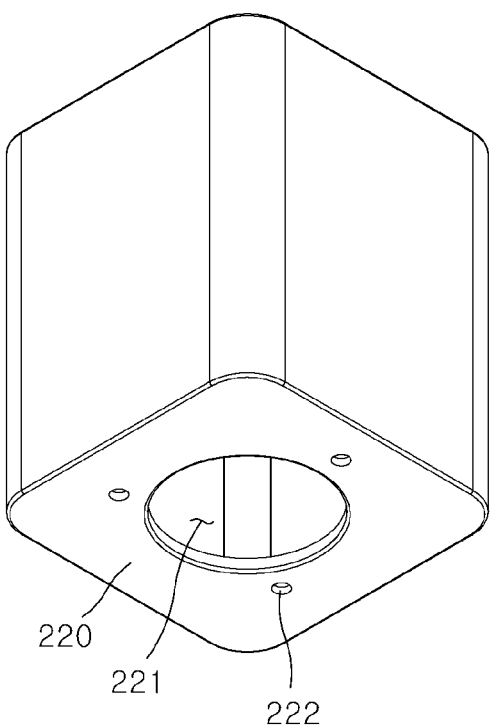

FIG. 14 is a cross-sectional view schematically a configuration of a fastening apparatus for a vehicle according to a second embodiment of the present disclosure is mounted. FIG. 15 is an exploded perspective view schematically illustrating the configuration of the fastening apparatus for a vehicle according to the second embodiment of the present disclosure. FIG. 16 is a perspective view illustrating schematically illustrating a configuration of a first fastening unit according to the second embodiment of the present disclosure. FIGS. 17A and 17B are a perspective view schematically illustrating a configuration of a casing according to the second embodiment of the present disclosure.

With reference to FIGS. 14 to 17B, a fastening apparatus 2 for a vehicle according to a second embodiment of the present disclosure includes a first fastening unit 100, a casing 200, a moving unit 600, a second fastening unit 700, a bearing unit 800, and a restoration unit 900.

The first fastening unit 100 is fixed to the first structure 10 and is fastened to the second fastening unit 700 described below. Thus, the first fastening unit 100 securely holds the second structure 20 and the first structure 10 with respect to each other.

The first fastening unit 100 according to the second embodiment has the same configuration as the first fastening unit 100 according to the first embodiment, and thus a detailed description thereof is omitted for convenience of description.

The casing 200 is fixed to the second structure 20 and is arranged in a manner that faces the first fastening unit 100.

The casing 200 supports both the moving unit 600 and the restoration unit 900 that will be described below.

The casing 200 may be directly fixed to the second structure 20. It is also possible that the casing 200 is fixed to a bracket or the like that is separately provided on the second structure 20.

The casing 200 according to the second embodiment has the same configuration as the casing 200 according to the first embodiment, and thus a detailed description thereof is omitted for convenience of description.

A first rotation prevention groove 222 may be formed in an lower surface of the separation prevention unit 220. The first rotation prevention groove 222 prevents rotation of the restoration unit 900 described below. The first rotation prevention groove 222 according to the second embodiment of the present disclosure may be formed in such a manner as to have the shape of a hole that passes in the upward-downward direction through the upper surface of the the separation prevention unit 220. A plurality of first rotation prevention grooves 222 may be formed. The first rotation prevention grooves 222 may be arranged to be spaced a predetermined distance apart along a circumferential direction of the separation prevention unit 220.

The moving unit 600 is installed inside the casing 200 in a manner that is enabled to ascend and descend.

Figure 18:
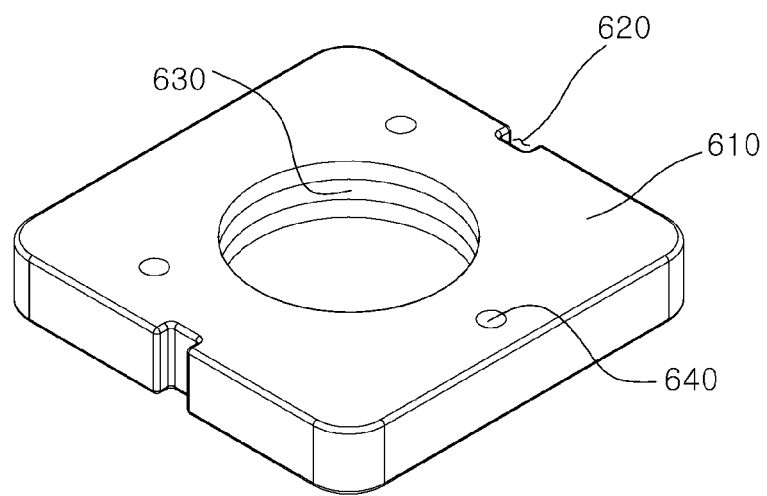
FIG. 18 is a perspective view schematically illustrating a configuration of a moving unit according to the second embodiment of the present disclosure.

FIG. 18 is a perspective view schematically illustrating a configuration of a moving unit according to the second embodiment of the present disclosure.

With reference to FIGS. 14 to 18, the moving unit 600 according to the second embodiment of the present disclosure includes a moving body 610, a guide portion 620, a first groove 630, and a second rotation prevention groove 640.

The moving body 610 forms a schematic exterior appearance of the moving unit 600 and supports all the guide portion 620, the first groove 630, and the second rotation prevention groove 640 that will be described below.

The moving body 610 according to the second embodiment of the present disclosure is formed in the shape of a hollow plate in such a manner that an insertion hole 611 is formed in a center portion thereof, and is installed inside the casing 200.

An outer circumferential surface of the moving body 610 is arranged to be spaced a predetermined distance away from the inner circumferential surface of the casing 200 in such a manner that the moving body 610 is enabled to smoothly ascend and descend inside the casing 200.

The moving body 610 may be provided in such a manner as to have a polygonal cross section.

Accordingly, the moving body 610 may be prevented from being rotated about a central axis thereof inside the casing 200.

The guide portion 620 is arranged on the outer circumferential surface of the moving body 610 and is connected to the guide rail 210 provided on the inner circumferential surface of the casing 200 in a slidably movable manner.

The guide portion 620 according to the second embodiment of the present disclosure may be a groove that is formed by concavely recessing the outer circumferential surface of the moving body 610 toward the central axis of the moving body 610.

The guide portion 620 may be formed in such a manner that a cross section thereof corresponds to a cross section of the guide rail 210.

A plurality of guide portions 620 may be provided and may be arranged to be spaced a distance apart along the outer circumferential surface of the moving body 610.

The guide rail 210 protruding from the inner circumferential surface of the casing 200 is inserted into the guide portion 620.

The moving body 610 moves slidably along the lengthwise direction of the guide rail 210. The moving body 610 is supported on the guide portion 620 in a manner that is enabled to ascend and descend with respect to the casing 200.

However, the guide portion 620 is not limited to this shape. In a case where the guide rail 210 is formed by concavely recessing the inner circumferential surface of the casing 200, it is also possible that the guide rail 210 is formed in a manner that protrudes from the outer circumferential surface of the moving body 610.

The first groove 630 is formed by concavely recessing an inner circumferential surface of the moving body 610, and one side of the bearing unit 800 described below is inserted into the first groove 630.

Accordingly, the first groove 630, along with a second groove 720 described below, may prevent the bearing unit 800 from between the moving unit 600 and the second fastening unit 700.

The first groove 630 according to the second embodiment may be formed in the shape of a ring-shaped groove in such a manner as to form a closed curve along the inner circumferential surface of the moving body 610.

The first groove 630 is formed in such a manner that a curvature thereof corresponds to a curvature of a bearing 820 provided on the bearing unit 800.

A circumferential portion of one side of the bearing 820 is inserted into the first groove 630, and an inner circumferential surface of the first groove 630 is brought into contact with an external surface of the bearing 820 in a rolling manner.

The second rotation prevention groove 640 is formed in the moving body 610 in a manner that passes therethrough and prevents the restoration unit 900 described below from being rotated.

The second rotation prevention groove 640 according to the second embodiment of the present disclosure may be formed in the shape of a hole in such a manner as to pass through the moving body 610 in the upward-downward direction.

A plurality of second rotation prevention grooves 640 may be formed.

The plurality of second rotation prevention grooves 640 are arranged to be spaced a distance apart along a circumference of a concentric circle that has a greater diameter than the insertion hole 611.

The second fastening unit 700 is installed inside the casing 200 in a rotatable manner, and is fastened to or separated from the first fastening unit 100 according to a rotational direction.

The second fastening unit 700 is rotatably supported on the moving unit 600 with the bearing unit 800 described below in between.

The second fastening unit 700, along with the moving unit 600, ascends and descends toward the first fastening unit 100.

Figure 19:
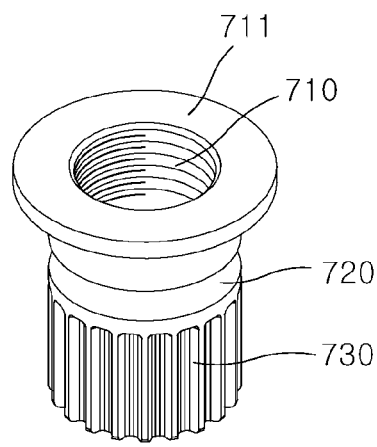
FIG. 19 is a perspective view schematically illustrating a configuration of a second fastening unit according to the second embodiment of the present disclosure.

FIG. 19 is a perspective view schematically illustrating a configuration of the second fastening unit 700 according to the second embodiment of the present disclosure.

With reference to FIGS. 14 to 19, the second fastening unit 700 according to the second embodiment includes a body portion 710, the second groove 720, and a tool connection portion 730.

The body portion 710 forms an exterior appearance of an upper portion of the second fastening unit 700 according to the second embodiment of the present disclosure and supports both the second groove 720 and the tool connection portion 730 that will be described below.

The body portion 710 according to the second embodiment of the present disclosure is formed in such a manner as to have the shape of a hollow cylinder and is inserted into the insertion hole 611 formed in a center portion of the moving body 610.

The body portion 710 is pressed into the inner circumferential surface of the moving body 610 for being fixed thereto.

In this case, the second groove 720 formed in an outer circumferential surface of the body portion 710 may be brought into contact with the bearing 820 in a rolling manner, and thus the body portion 710 may be indirectly pressed into the inner circumferential surface of the moving body 610.

Accordingly, the body portion 710 may be formed to have a smaller diameter than the insertion hole 611.

A screw threshold to be combined with the extension portion 120 is provided on an inner circumferential surface of the body portion 710.

A flange 711 preventing the body portion 710 from being separated from the moving body 610 may be provided on the body portion 710.

The flange 711 according to the second embodiment of the present disclosure may be formed in the shape of a circular plate in such a manner as to horizontally extend outward in a radial direction of the body portion 710 from an edge of an upper end portion of the body portion 710.

A lower surface of the flange 711 is brought into contact with the upper surface of the moving body 610, and thus the body portion 710 is prevented from being separated and thus being positioned under the moving body 610.

The second groove 720 is formed by concavely recessing the outer circumferential surface of the body portion 710, and the other portion of the bearing portion 800 is inserted into the second groove 720.

Accordingly, the second groove 720, along with the first groove 630, may prevent the bearing unit 800 from being separated from between the moving unit 600 and the second fastening unit 700.

The second groove 720 according to the second embodiment may be formed in the shape of a ring-shaped groove in such a manner as to form a closed curve along the outer circumferential surface of the body portion 710.

The second groove 720 is provided at a position for facing the first groove 630 when the flange 711 is brought into contact with the moving body 610.

The second groove 720 is formed in such a manner that a curvature thereof corresponds to a curvature of the bearing 820 provided on the bearing unit 800.

A circumference portion of the other side of the bearing 820 is inserted into the second groove 720, and an inner circumferential surface of the second groove 720 is brought into contact with the external surface of the bearing 820 in a rolling manner.

The tool connection portion 730 extending from the body portion 710 forms an exterior appearance of a lower portion of the second fastening unit 700 according to the second embodiment of the present disclosure.

The tool connection portion 730 is provided in a manner that is connectable to the working tool 30, such as a motor-driven drill or a socket wrench.

The tool connection portion 730 according to the second embodiment of the present disclosure may be formed in the shape of a bar in such a manner as to vertically downward from a lower surface of the body portion 710.

The tool connection portion 730 is formed to have such a length that a lower end portion thereof protrudes downward from the moving body 610.

Accordingly, the tool connection portion 730 can improve the accessibility to the working tool 30.

The tool connection portion 730 may be formed in such a manner as to have a polygonal cross section or a sawtooth-shaped cross section so that the tool connection portion 730 may be easily connected to the working tool 30 and at the same time may be efficiently provided with a rotational force from the working tool 30.

The bearing portion 800 is provided between the moving unit 600 and the second fastening unit 700 and rotatably supports the second fastening unit 700 with respect to the moving unit 600.

Accordingly, the bearing portion 800 guides the second fastening unit 700 in being smoothly rotated without any change in position in a state of maintaining an original position thereof with respect to the first fastening unit 100.

Figure 20:
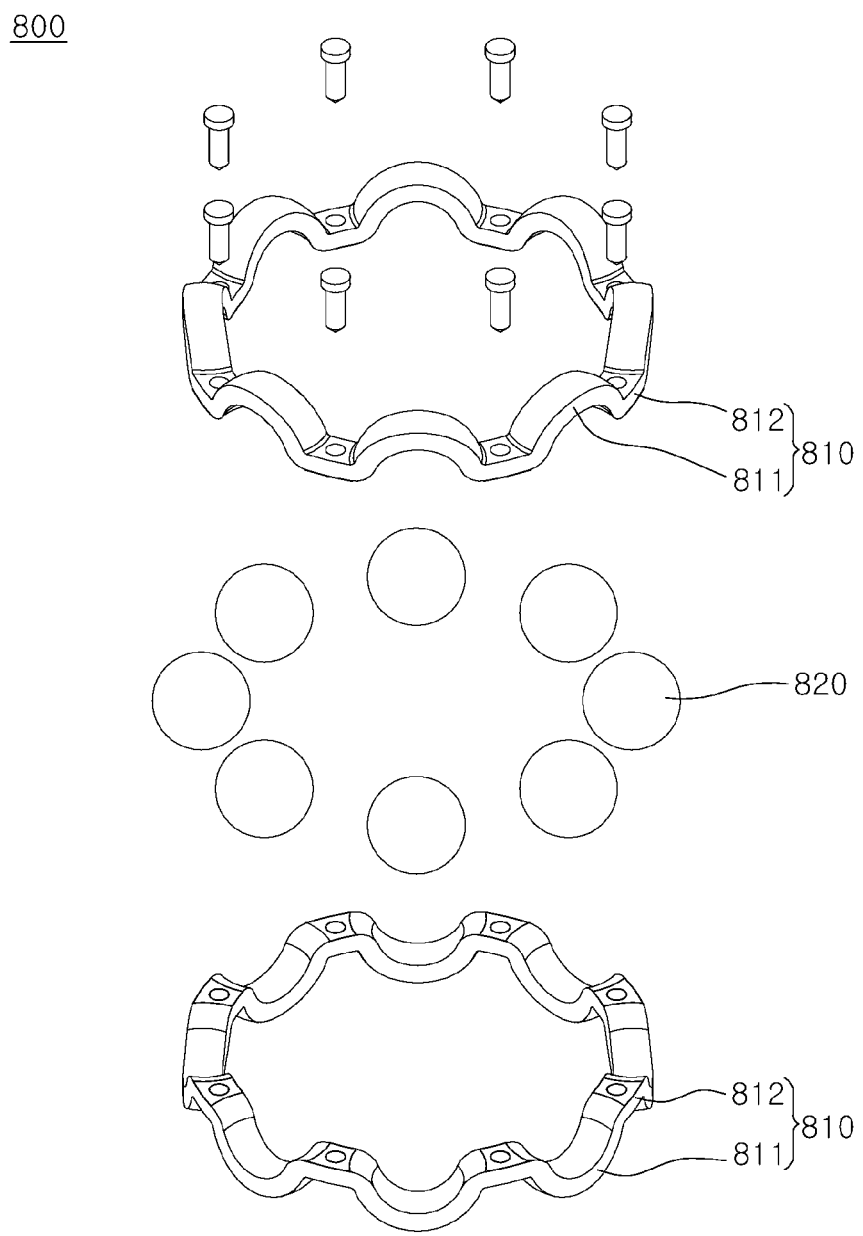
FIG. 20 is a perspective view schematically illustrating a configuration of a bearing unit according to the second embodiment of the present disclosure.

FIG. 20 is a perspective view schematically illustrating a configuration of the bearing unit 800 according to the second embodiment of the present disclosure.

With reference to FIGS. 14 to 20, the bearing unit 800 according to the second embodiment of the present disclosure includes a race 810 and the bearing 820.

The race 810 is arranged between the moving unit 600 and the second fastening unit 700, more particularly, between the first groove 630 and the second groove 720.

The race 810 rotatably supports the bearing 820 described below.

Accordingly, the race 810 may prevent the bearing 820 from rolling out of the first groove 630 and the second groove 720 and from being separated therefrom.

One pair of races 810 may be provided.

The races 810 constituting one pair are connected to each other in a manner as to be separable from each other in the upward-downward direction.

Each of the one pair of races 810 according to the second embodiment of the present disclosure includes an accommodation portion 811 and an assembly unit 812.

The accommodation portion 811 is provided in such a manner that the bearing 820 described below may be accommodated therein.

A plurality of accommodation portions 811 are provided and are arranged to be spaced a distance apart along a circumferential direction of the race 810.

A plurality of assembly units 812 are provided and each of the plurality of assembly units 812 is arranged between each of the plurality of adjacent accommodation portions 811.

The assembly unit 812 and the accommodation portion 811 are alternately arranged along the circumferential direction of the race 810.

The accommodation portion 811 and the assembly unit 812 according to the second embodiment of the present embodiment may extend in such a manner as form a concave-convex shape along the circumferential direction of the race 810.

That is, the accommodation portion 811 and the assembly unit 812 may be formed in a manner that extends in a corrugated shape along the circumferential direction of the race 810.

Accordingly, the accommodation portions 811 provided in the one pair of the races 810 are arranged to be spaced a distance apart, and thus a space in which the bearing 820 described below may be installed is formed between respective internal surfaces of the accommodation portions 811

In addition, the assembly units 812 provided on the one pair of the races 810 are brought into contact with each other in such a manner that respective internal surfaces thereof face each other.

The one pair of the races 810 provided on the assembly units 812 may be combined with each other by a fixation member.

The one pair of the races 810 provided on the assembly units 812 may be combined with each other by the fixation member, such as a pin.

The bearing 820 is installed between the one pair of the races 810 in a rotatable manner.

Both circumferential portions of the bearing 820 are brought into contact with the moving unit 600 and the second fastening unit 700, respectively, in a rolling manner, and rotatably supports the second fastening unit 700 with respect to the moving unit 600.

The bearing 820 according to the second embodiment may be formed in such a manner as to have the shape of a ball bearing.

A plurality of bearings 820 are provided and are installed inside the plurality of accommodation portions 811, respectively.

The bearing 820 is brought, in a rolling manner, into contact with an internal surface of the accommodation portion 811 of which upper and lower circumferential portions are provided on the one pair of the races 810, respectively.

Circumferential portions of both left and right sides of the bearing 820 are brought, in a rolling manner, into contact with the first groove 630 and the second groove 720, respectively.

When the second fastening unit 700 is separated from the first fastening unit 100, the restoration unit 900 restores the moving unit 600 to an original position thereof.

Accordingly, when the first fastening unit 100 and the second fastening unit 700 are repeatedly fastened, the restoration unit 900 may secure the consistent assembly performance.

Figure 21:
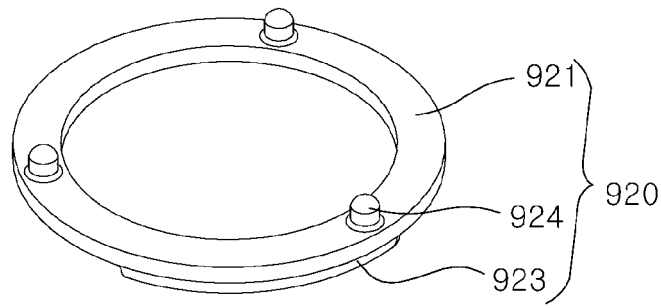
FIG. 21 is a perspective view schematically illustrating a configuration of a restoration unit according to the second embodiment of the present disclosure.
Figure 21:
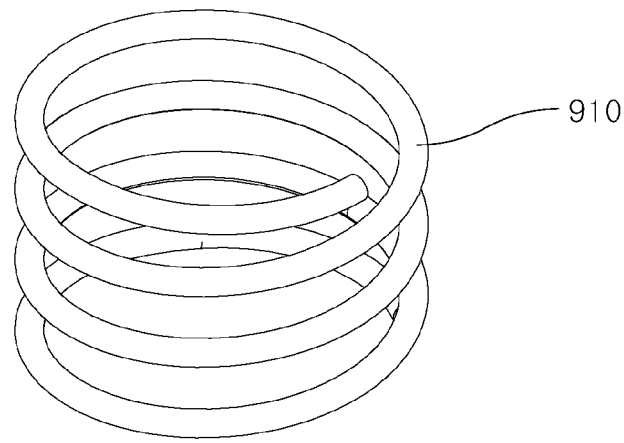
Figure 21:
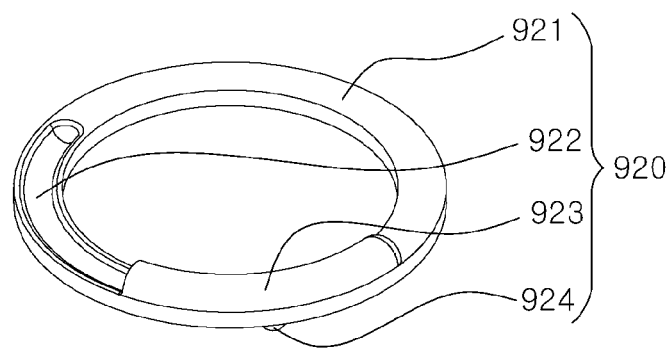

FIG. 21 is a perspective view schematically illustrating a configuration of the restoration unit 900 according to the second embodiment of the present disclosure.

With reference to FIGS. 14 to 21, the restoration unit 900 according to the second embodiment of the present disclosure includes an elastic member 910 and a pad 920.

The elastic member 910 is installed between the casing 200 and the moving unit 600 and elastically supports the moving unit 600 with respect to the casing 200.

The elastic member 910 according to the second embodiment of the present disclosure may be formed in the shape of a coil spring in such a manner as to be provided along a lengthwise direction thereof in an expandable and contractable manner.

The elastic member 910 is arranged in such a manner that the lengthwise direction thereof is parallel with the lengthwise direction of the casing 200.

The elastic member 910 is arranged in such a manner that both end portions thereof face a lower surface of the moving body 610 and an upper surface of the separation prevention unit 220, respectively.

The elastic member 910 may be formed in such a manner that, in a case where the moving unit 600 is arranged at an initial position thereof, a length of the elastic member 910 corresponds to a distance between a lower surface surface of the guide portion 610 and an upper surface of the casing portion 220.

In this case, the initial position of the moving unit 600 may possibly be various design-changed within a range of heights of the moving unit 300 that can be positioned inside the casing 200 in a state where the body portion 710 and the extension portion 120 combined in a nut-bolt fastening manner are no longer combined.

The pads 920 are provided in one pair and are fixed to the moving unit 600 and the casing 200, respectively.

The pads 920 in one pair support both sides of the elastic member 910 with respect to the moving unit 600 and the casing 200, respectively.

The pad 920 according to the second embodiment of the present disclosure includes a pad body 921, a seating portion 922, an insertion portion 923, and a rotation prevention portion 924.

The pad body 921 forms a schematic exterior appearance of the pad 920 according to the second embodiment of the present disclosure and supports all the seating portion 922, the insertion portion 923, and the rotation prevention portion 924 that will be described below.

The pad body 921 according to the second embodiment of the present disclosure may be formed in such a manner as to have the shape of a circular ring.

The pad body 921 that is to be provided on one pad 920 of the one pair of the pads 920 is arranged in such a manner that an external surface thereof faces the upper surface of the separation prevention unit 220 and that an internal surface thereof faces a lower end portion of the elastic member 910.

The pad body 921 that is to be provided in the other one pad 920 of the one pair of the pads 920 is arranged in such a manner that an external surface thereof faces a lower surface of the descending portion 610 and that an internal surface thereof faces an upper end portion of the elastic member 910.

The seating portion 922 is formed by concavely recessing an external face of the pad body 921 inward, and the end portion of the elastic member 910 is seated on the seating portion 522.

The seating portion 922 according to the second embodiment of the present disclosure may be formed in the shape of a groove by concavely recessing the internal surface of the pad body 921 toward the external surface thereof.

The seating portion 922 extends in such a manner that a lengthwise direction thereof is in parallel with a circumferential direction of the pad body 921.

The seating portion 922 may be formed in such a manner that a curvature thereof has a value corresponding to a curvature of a coil of the elastic member 910.

The insertion portion 923 is provided in such a manner as to prevent the elastic member 910 seated on the seating portion 922 from being separated from the seating portion 922.

The insertion portion 923 according to the second embodiment of the present disclosure may be formed in such a manner that both end portions thereof are integrally connected to edges, respectively, of an inner circumference and an outer circumference of the pad body 921 and that an upper portion of the seating portion 922 is surrounded.

The insertion portion 923 extends in a lengthwise direction thereof along the circumferential direction of the pad body 921.

The insertion portion 923 is formed to have a space inside, and an end portion of the elastic member 910 is inserted into the space in the insertion portion 923.

The rotation prevention portion 924 protrudes from the pad body 921 in such a manner as to prevent rotation of the pad body 921.

The rotation prevention portion 924 according to the second embodiment of the present disclosure may be formed in the shape of a protrusion in such a manner as to vertically protrude from an external surface of the pad body 921.

A plurality of rotation prevention portions 924 may be provided and may be arranged to be a predetermined distance apart along the circumferential direction of the pad body 921.

The rotation prevention portion 924 formed on the pad body 921 to be provided on one pad 920 of the one pair of the pads 920 is inserted into the first rotation prevention groove 222 that is formed in the separation prevention unit 220 in a manner that passes therethrough.

The rotation prevention portion 924 formed on the pad body 921 to be provided on the other pad 920 of the one pair of the pads 920 is inserted into the second rotation prevention groove 640 that is formed in the moving body 610 in a manner that passes therethrough.

A process of assembling the fastening apparatus 2 for a vehicle according to the second embodiment of the present disclosure will be described in detail below.

Figure 22:
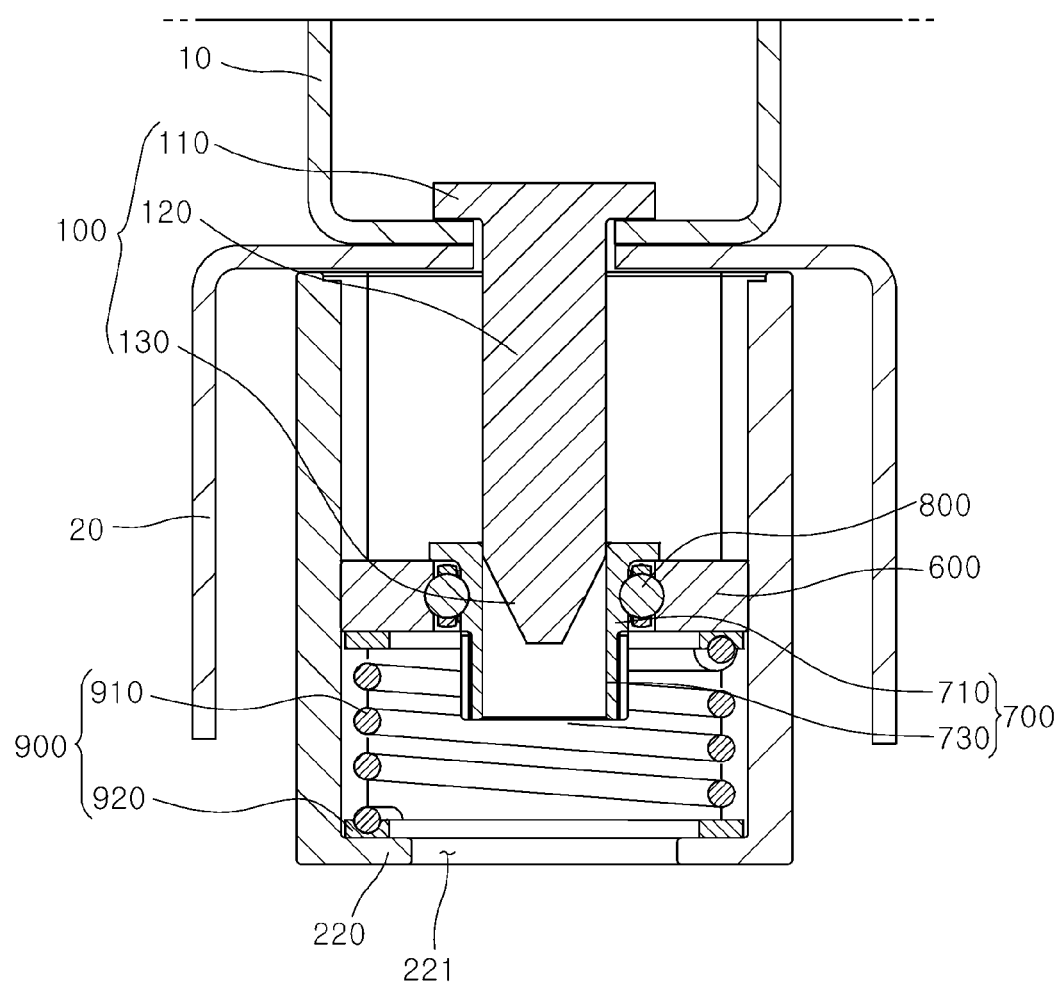
FIGS. 22 to 24 are views each schematically illustrating a process of assembling the fastening apparatus for a vehicle according to the second embodiment of the present disclosure.
Figure 23:
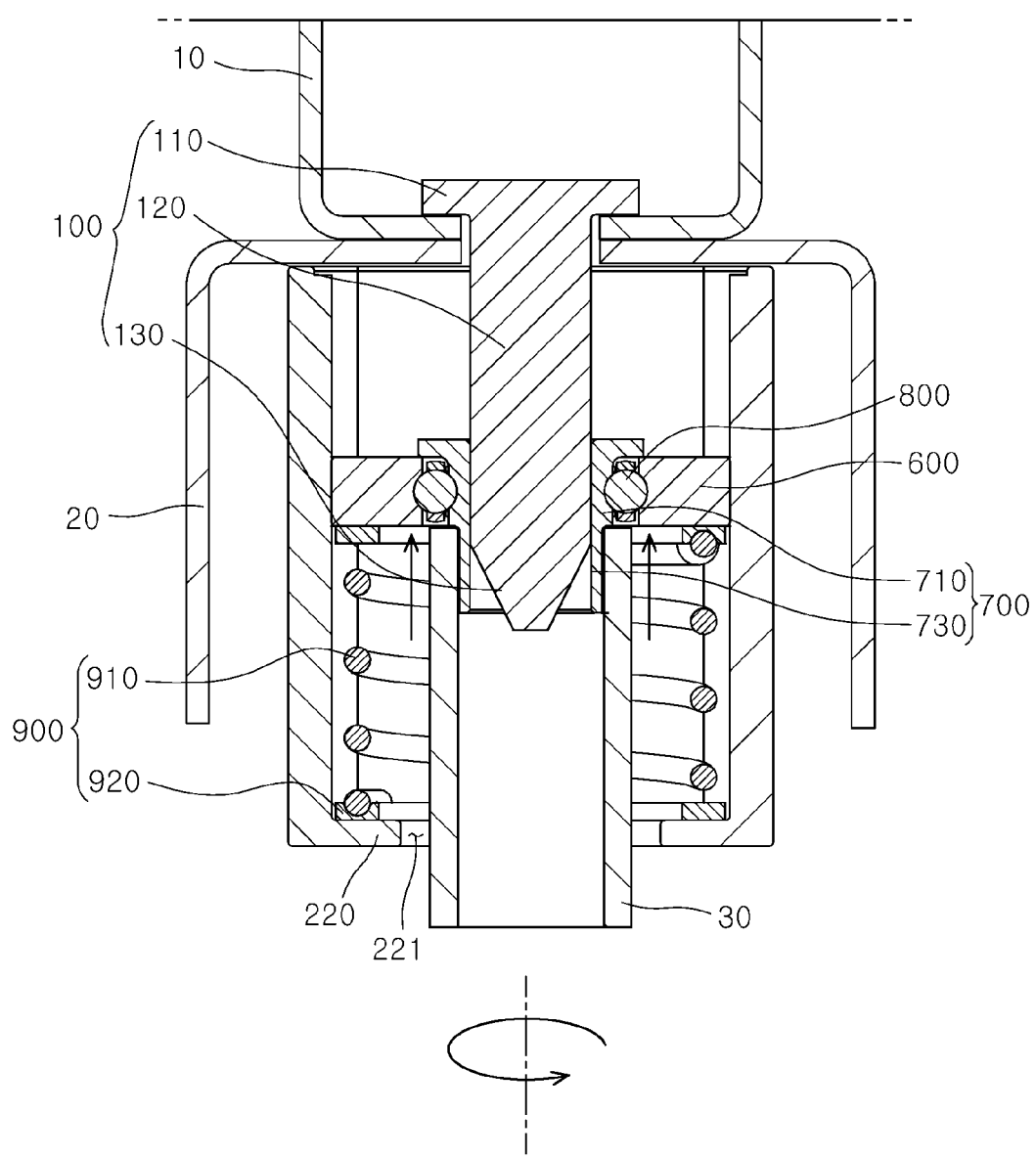
Figure 24:
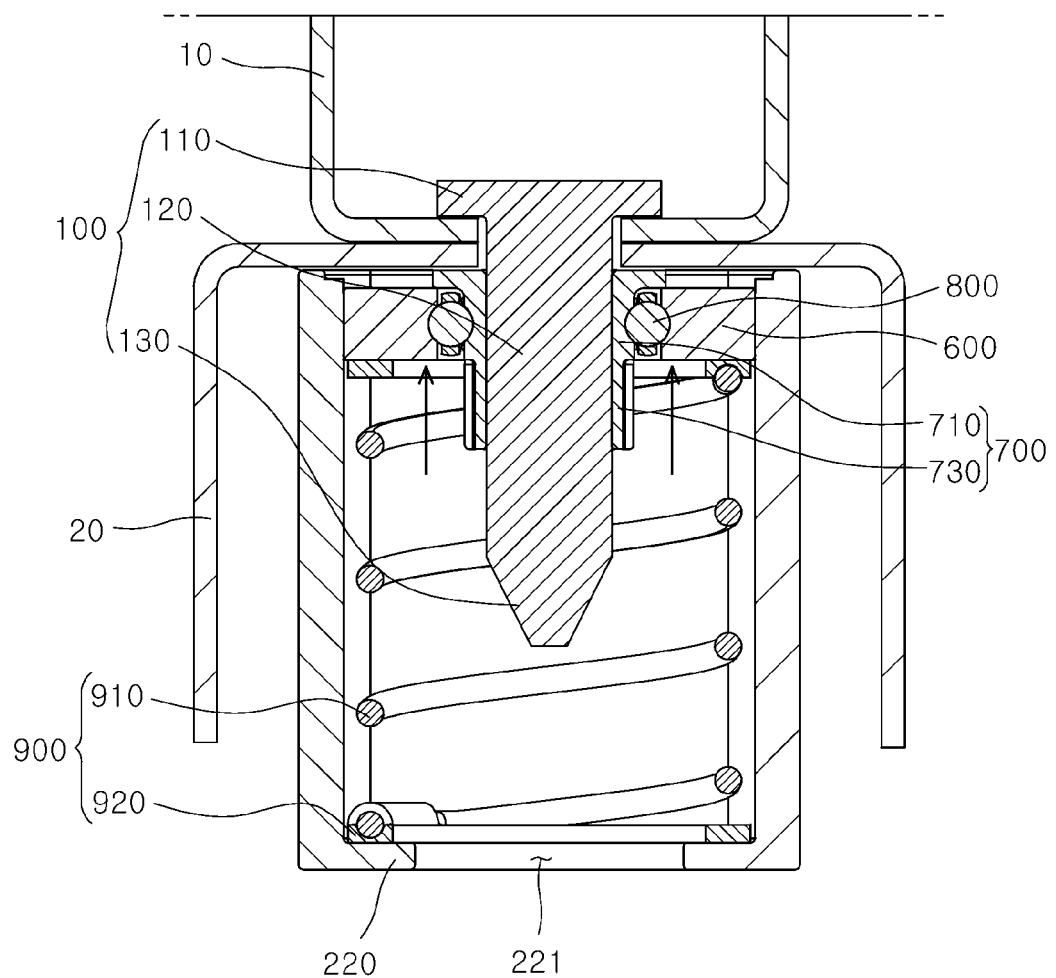

FIGS. 22 to 24 are views each schematically illustrating a process of assembling the fastening apparatus 2 for a vehicle according to the second embodiment of the present disclosure.

With reference to FIGS. 22 to 24, the first structure 10 is seated on the upper portion of the second structure 20, and thus the first fastening unit 100 fastened to the first structure 10 is inserted into the casing 200.

The entry guidance portion 130, together with the moving unit 600, is inserted into the body portion 710 provided on the second fastening unit 700 arranged at an initial position thereof inside the casing 200.

In this case, the entry guidance portion 130 is formed in such a manner that a width thereof decreases toward the end thereof. Thus, the entry guidance portion 130 may be smoothly inserted into the body portion 710.

The working tool 30 enters the casing 200 through the tool-dedicated hole 221, and is connected to the tool connection portion 730 provided on the second fastening unit 700.

The working tool 30 provides a rotational force to the second fastening unit 700 and at the same time pushes upward the moving unit 600.

When the moving unit 600 ascends a predetermined distance, the inner circumferential surface of the body portion 710 is engaged with the outer circumferential surface of the extension portion 120.

The second fastening unit 700 is continuously rotated by the working tool 30, proceeds to be combined with the first fastening unit 100 in a nut-bolt fastening manner, and, together with the moving unit 600, is moved upward from the casing 200.

In this case, the elastic member 910 expands in the lengthwise direction thereof and increases an elastic restoring force thereof.

An upper surface of the flange member 711 is brought into contact with the internal surface of the second structure 20, and assembling of the first fastening unit 100 and the second fastening unit 700 is completed.

The first fastening unit 100 and the second fastening unit 700 are separated from each other in the reverse order to the order in which the first fastening unit 100 and the second fastening unit 700, as described above, are fastened to each other.

In this case, when the first fastening unit 100 and the second fastening unit 700 combined in a nut-bolt fastening manner are no longer combined, the elastic member 910 contracts by the increased elastic restoring force in the lengthwise direction thereof, causes the moving unit 600 and the second fastening unit 700 to descend, and returns the moving unit 600 and the second fastening unit 700 to respective initial positions thereof.

The

The embodiments disclosed above are directed to a fastening apparatus for a vehicle, the apparatus being capable of easily mounting or separating a top hat or a battery module on and from a chassis frame of a purpose-built vehicle (PBV).

In the fastening apparatus for a vehicle according to the embodiments disclosed above, components necessary to fasten the first structure and the second structure to each other are realized as one assembly. Thus, a machine and manpower can be prevented from being wasted in an additional feeding operation during assembling, and the components can be prevented from being lost.

In addition, in the fastening apparatus for a vehicle according to the embodiments disclosed above, in a state where the moving unit causes the second fastening unit to maintain an original position thereof with respect to the first fastening unit, the second fastening unit is supported by the moving unit in a rotatable manner and in a manner that is enabled to ascend and descend. Thus, erroneous assembling can be prevented.

In addition, in the fastening apparatus for a vehicle according to the embodiments disclosed above, the second fastening unit is directly supported on the moving unit in a rotatable manner. Thus, the number of components can be reduced.

In addition, in the fastening apparatus for a vehicle according to the embodiments disclosed above, the first fastening unit and the second fastening unit can be repeatedly fastened to and separated from each other by the restoration unit. Thus, the efficiency and consistency of assembling can be improved.

In addition, in the fastening apparatus for a vehicle according to the embodiments disclosed above, the elastic member is arranged between an upper surface of the guide portion and an internal surface of an upper portion of the cashing unit. Thus, interference with the working tool can be prevented.

In addition, in the fastening apparatus for a vehicle according to the embodiments disclosed above, in a state where the moving unit and the bearing unit cause the second fastening unit to maintain an original position thereof with respect to the first fastening unit, the second fastening unit is supported by the moving unit and the bearing unit in a rotatable manner and in a manner that is enabled to ascend and descend.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A fastening apparatus for a vehicle, comprising:
   a first fastening unit fixed to a first structure;
   a casing fixed to a second structure and configured to face the first fastening unit;
   a moving unit installed inside the casing, and the moving unit being configured to ascend and descend;
   a second fastening unit rotatably combined with the moving unit and being configured to be fastened to or separated from the first fastening unit according to a rotational direction; and
   a restoration unit being configured to restore the moving unit to an initial position thereof, in response to the second fastening unit being separated from the first fastening unit,
   wherein the restoration unit comprises:
   an elastic member installed between the casing and the moving unit, the elastic member being expandable and contractable along a lengthwise direction thereof; and
   one pair of pads fixed to the moving unit and the casing, respectively, and supporting both sides of the elastic member, respectively.

2. The fastening apparatus of claim 1, wherein the first fastening unit comprises:
   a stationary portion fixed on an internal surface of the first structure;
   an extension portion extending from the stationary portion and out of the first structure, a screw threshold being formed on an outer circumferential surface of the extension portion; and
   an entry guidance portion extending from the extension portion and being configured to guide the extension portion in entering the second fastening unit.

3. The fastening apparatus of claim 1, further comprising:
   an assembly unit extending the casing and detachably combined with the second structure;
   a guide rail protruding from an inner circumferential surface of the casing and being configured to support the moving unit inside the casing to ascend and descend; and
   a separation prevention unit extending from the casing and preventing the restoration unit from being separated from the casing.

4. The fastening apparatus of claim 3, further comprising:
   a hole formed in the separation prevention unit, the hole configured to accept a working tool into the hole-dedicated hole.

5. The fastening apparatus of claim 1, wherein each of the one pair of pads comprises: a pad body arranged to face an end portion of the elastic member; a seating portion formed by concavely recessing an external face of the pad body inward, the end portion of the elastic member being seated on the seating portion; and an insertion portion configured to prevent the elastic member from being separated from the seating portion.

6. The fastening apparatus of claim 5, wherein the insertion portion extends along a circumferential direction of the pad body, the end portion of the elastic member being inserted into the insertion portion.

7. The fastening apparatus of claim 5, wherein the pad further comprises:
   a rotation prevention portion protruding from the pad body to prevent rotation of the pad body.

8. The fastening apparatus of claim 1, wherein the moving unit comprises:
   a moving body installed inside the casing, the second fastening unit being inserted into the moving body;
   a guide portion extending from an outer circumferential surface of the moving body and connected in a slidably movable manner to the casing; and a support portion extending from an inner circumferential surface of the moving body and rotatably supporting the second fastening unit.

9. The fastening apparatus of claim 8, wherein the inner circumferential surface of the moving body is spaced at a distance from an inner circumferential surface of the second fastening unit.

10. The fastening apparatus of claim 8, wherein the second fastening unit comprises:
a body portion inserted into the moving body, a screw thread being provided on an inner circumferential surface of the body portion;
a tool connection portion extending from the body portion being configured to connect to a working tool; and
a hooking portion extending from the body portion and being combined with the support portion in a manner that is hooked thereon.

11. The fastening apparatus of claim 10, wherein an upper end portion of the hooking portion extends outward in a radial direction of the body portion.

12. A fastening apparatus for a vehicle, comprising:
a first fastening unit fixed to a first structure;
a casing fixed to a second structure and configured to face the first fastening unit;
a moving unit installed inside the casing, and the moving unit being configured to ascend and descend;
a second fastening unit rotatably installed inside the casing and being configured to be fastened to or separated from the first fastening unit according to a rotational direction thereof; and
a bearing unit provided between the moving unit and the second fastening unit and, being configured to rotatably support the second fastening unit with respect to the moving unit.

13. The fastening apparatus of claim 12, wherein the bearing unit comprises:
a pair of races arranged between the moving unit and the second fastening unit, the pair of races being separably connected to each other; and
a plurality of bearings rotatably installed between the pair of races and being brought into contact with the moving unit and the second fastening unit in a rolling manner.

14. The fastening apparatus of claim 13, wherein the pair of races comprise:
a plurality of accommodation portions arranged to be spaced apart, the plurality of bearings being accommodated in the plurality of accommodation portions, respectively; and
a plurality of assembly units, each of the plurality of assembly units being arranged between each of the plurality of adjacent accommodation portions, a fixation member being inserted into the plurality of assembly units in a manner that passes therethrough.

15. The fastening apparatus of claim 14, wherein the accommodation portion and the assembly unit are alternately arranged along a circumferential direction of the race.

16. The fastening apparatus of claim 14, wherein the accommodation portion and the assembly unit extend to form a concave-convex shape along a circumferential direction of the race.

17. The fastening apparatus of claim 12, wherein the moving unit comprises:
a moving body installed inside the casing;
a guide portion arranged on an outer circumferential surface of the moving body and connected to a guide rail provided on an inner circumferential surface of the casing in a slidably movable manner; and
a first groove formed by concavely recessing an inner circumferential surface of the moving body, and one side of the bearing unit being inserted into the first groove.

18. The fastening apparatus of claim 17, wherein the moving body has a polygonal cross section.

19. The fastening apparatus of claim 17, wherein the second fastening unit comprises:
a body portion pressed into the inner circumferential surface of the moving body;
a second groove formed by concavely recessing an outer circumferential surface of the body portion, another side of the bearing unit being inserted into the second groove; and
a tool connection portion extending from the body portion and configured to be connected to a working tool.

20. A fastening apparatus for a vehicle, comprising:
a first fastening unit fixed to a first structure;
a casing fixed to a second structure and configured to face the first fastening unit;
a moving unit installed inside the casing, and the moving unit being configured to ascend and descend;
a second fastening unit rotatably combined with the moving unit and being configured to be fastened to or separated from the first fastening unit according to a rotational direction; and
a restoration unit being configured to restore the moving unit to an initial position thereof, in response to the second fastening unit being separated from the first fastening unit,
wherein the moving unit comprises:
a moving body installed inside the casing, the second fastening unit being inserted into the moving body;
a guide portion extending from an outer circumferential surface of the moving body and connected in a slidably movable manner to the casing; and
a support portion extending from an inner circumferential surface of the moving body and rotatably supporting the second fastening unit.

* * * * *